US012793355B2

(12) United States Patent
Inoue et al.

(10) Patent No.: US 12,793,355 B2
(45) Date of Patent: Nov. 10, 2026

(54) CONTROL DEVICE, CONTROL METHOD, AND CONTROL PROGRAM

(71) Applicant: FUJIFILM Corporation, Tokyo (JP)

(72) Inventors: Kazuki Inoue, Saitama (JP); Kazuki Ishida, Saitama (JP); Masahiko Miyata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 18/676,895

(22) Filed: May 29, 2024

(65) Prior Publication Data

US 2024/0312164 A1 Sep. 19, 2024

Related U.S. Application Data

(63) Continuation of application No. PCT/JP2022/040695, filed on Oct. 31, 2022.

(30) Foreign Application Priority Data

Nov. 30, 2021 (JP) ................................ 2021-194119

(51) Int. Cl.
*G06T 5/50* (2006.01)
*G06T 19/00* (2011.01)

(52) U.S. Cl.
CPC .............. *G06T 19/006* (2013.01); *G06T 5/50* (2013.01); *G06T 2207/20221* (2013.01)

(58) Field of Classification Search
CPC ..................... G06T 19/006; G06T 5/50; G06T 2207/20221; G09G 5/00; G09G 5/36;
(Continued)

(56) References Cited

U.S. PATENT DOCUMENTS 9,462,255 B1 * 10/2016 Marason ................. G01S 17/86
2007/0025723 A1 * 2/2007 Baudisch ............... H04N 5/262
348/E5.051

(Continued)

FOREIGN PATENT DOCUMENTS

JP 2007-192988 A 8/2007
JP 2012-212345 A 11/2012

(Continued)

OTHER PUBLICATIONS

International Preliminary Report on Patentability and Written Opinion of the International Searching Authority for International Application No. PCT/JP2022/040695, dated Jun. 13, 2024, with an English translation.

(Continued)

*Primary Examiner* — Daniel F Hajnik
*Assistant Examiner* — Adeel Bashir
(74) *Attorney, Agent, or Firm* — Birch, Stewart, Kolasch & Birch, LLP

(57) ABSTRACT

A control device includes a processor, the processor is configured to: generate third image data based on first image data and second image data; and output the third image data, and a second image based on the second image data in a third image represented by the third image data is an image indicating that specific content is associated with the third image, and surrounds a first image based on the first image data in the third image.

15 Claims, 25 Drawing Sheets

(58) Field of Classification Search
CPC ............ G09G 5/377; G09G 5/38; H04N 5/66; H04N 9/3152; H04N 9/317; H04N 9/3185; H04N 9/3194
See application file for complete search history.

(56) References Cited

U.S. PATENT DOCUMENTS

| | | | | |
|---|---|---|---|---|
| 2008/0122859 | A1* | 5/2008 | Cazier | G09G 5/06 345/593 |
| 2011/0145068 | A1* | 6/2011 | King | G06F 16/435 348/222.1 |
| 2012/0250940 | A1 | 10/2012 | Kasahara | |
| 2014/0267836 | A1 | 9/2014 | Nishizaka | |
| 2020/0234498 | A1* | 7/2020 | Price | G06T 7/12 |
| 2021/0142072 | A1 | 5/2021 | Matsumoto et al. | |

FOREIGN PATENT DOCUMENTS

| | | | |
|---|---|---|---|
| JP | 2013-15468 | A | 1/2013 |
| JP | 2013-175942 | A | 9/2013 |
| JP | 2014-179874 | A | 9/2014 |
| JP | 2016-213776 | A | 12/2016 |
| JP | 2017-28529 | A | 2/2017 |
| JP | 2017-162192 | A | 9/2017 |

OTHER PUBLICATIONS

International Search Report for International Application No. PCT/JP2022/040695, dated Jan. 17, 2023, with an English translation.
Japanese Office Action for corresponding Japanese Application No. 2023-564818, dated Mar. 3, 2026, with English translation.

* cited by examiner

CONTROL DEVICE, CONTROL METHOD, AND CONTROL PROGRAM

CROSS REFERENCE TO RELATED APPLICATION

This is a continuation of International Application No. PCT/JP2022/040695 filed on Oct. 31, 2022, and claims priority from Japanese Patent Application No. 2021-194119 filed on Nov. 30, 2021, the entire disclosures of which are incorporated herein by reference.

BACKGROUND OF THE INVENTION

1. Field of the Invention

The present invention relates to a control device, a control method, and a computer readable medium storing a control program.

2. Description of the Related Art

JP2016-213776A discloses a video creation device that acquires an image of a position marker used to specify a display position of a virtual object in an augmented reality technology, completes a video for projection mapping by incorporating the image into the video for projection mapping, projects the video toward a showroom through a video projection apparatus, and displays the image of the position marker on a floor surface of the showroom.

JP2017-162192A discloses that, in projection mapping in which video content is projected to a three-dimensional object through a projector in consideration of a three-dimensional structure of the three-dimensional object, in a case where a user captures the video content with a camera mounted on a smart device, AR content is superimposed and displayed on a captured video.

SUMMARY OF THE INVENTION

One embodiment according to a technology of the present disclosure provides a control device, a control method, and a computer readable medium storing a control program that can perform notification regarding specific content associated with a display image.

A control device according to an aspect of the present invention is a control device comprising a processor, in which the processor is configured to:

generate third image data based on first image data and second image data; and output the third image data, and a second image based on the second image data in a third image represented by the third image data is an image indicating that specific content is associated with the third image, and surrounds a first image based on the first image data in the third image.

A control device according to an aspect of the present invention is a control device comprising a processor, in which the processor is configured to:

generate third image data based on first image data and second image data; and output the third image data, and a second image based on the second image data in a third image represented by the third image data is an image that is included in a first image based on the first image data in the third image and indicates a position of an image of a first object with which specific content is associated.

A control method according to an aspect of the present invention is a control method executed by a processor of a control device, the method comprising:

generating third image data based on first image data and second image data; and outputting the third image data, in which a second image based on the second image data in a third image represented by the third image data is an image indicating that specific content is associated with the third image, and surrounds a first image based on the first image data in the third image.

A control method according to an aspect of the present invention is a control method executed by a processor of a control device, the method comprising:

generating third image data based on first image data and second image data; and outputting the third image data, in which a second image based on the second image data in a third image represented by the third image data is an image that is included in a first image based on the first image data in the third image and indicates a position of an image of a first object with which specific content is associated.

A control program stored in a computer readable medium according to an aspect of the present invention is a control program for causing a processor of a control device to execute a process comprising:

generating third image data based on first image data and second image data; and outputting the third image data, in which a second image based on the second image data in a third image represented by the third image data is an image indicating that specific content is associated with the third image, and surrounds a first image based on the first image data in the third image.

A control program stored in a computer readable medium according to an aspect of the present invention is a control program for causing a processor of a control device to execute a process comprising:

generating third image data based on first image data and second image data; and outputting the third image data, in which a second image based on the second image data in a third image represented by the third image data is an image that is included in a first image based on the first image data in the third image and indicates a position of an image of a first object with which specific content is associated.

According to the present invention, it is possible to provide the control device, the control method, and the computer readable medium storing the control program that can perform the notification regarding the specific content associated with the display image.

DESCRIPTION OF THE PREFERRED EMBODIMENTS

Hereinafter, an example of an embodiment of the present invention will be described with reference to the drawings.

Embodiment 1

<Projection System 100 of Embodiment 1>

Figure 1:
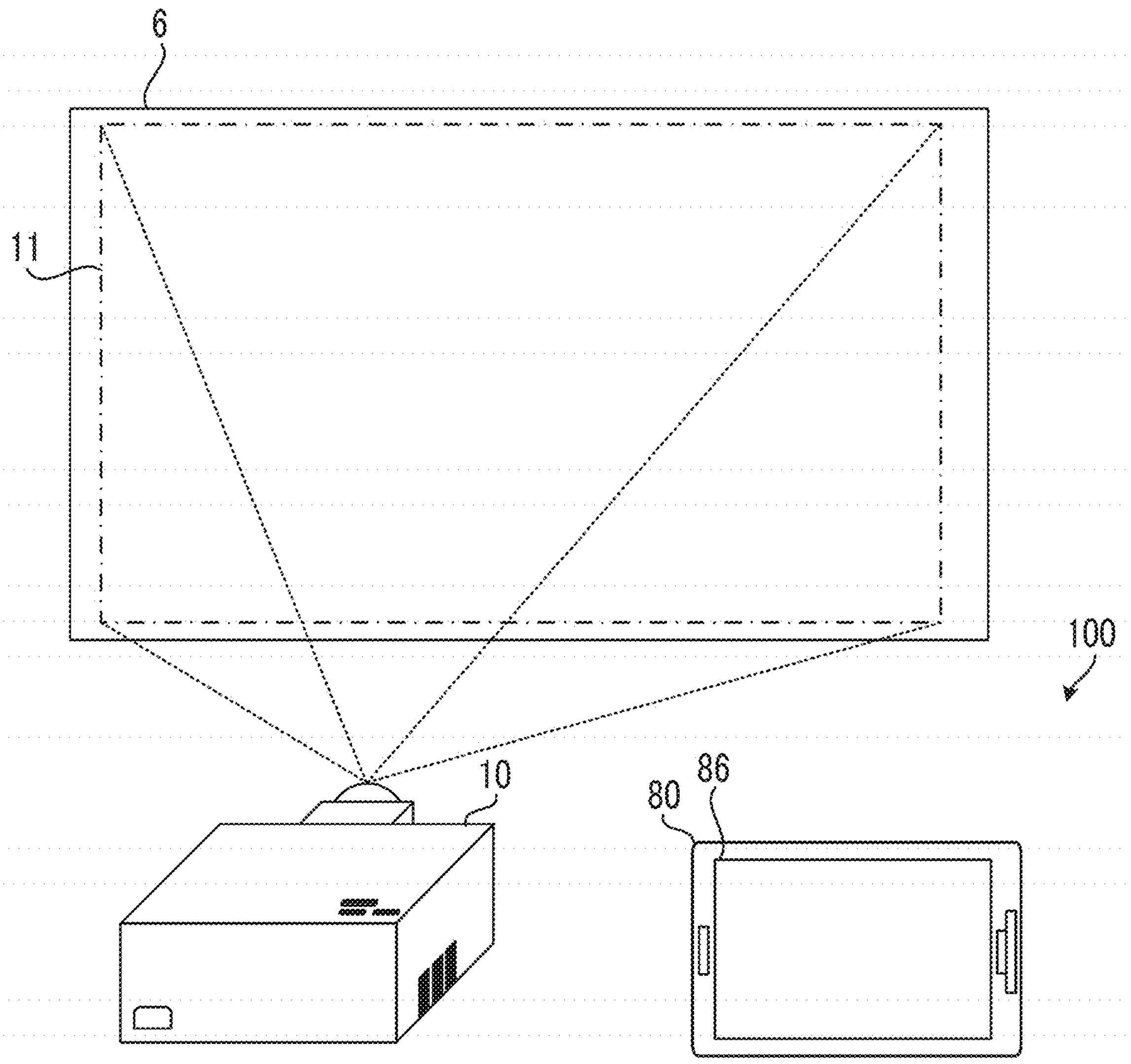
FIG. 1 is a diagram showing an example of a projection system 100 of Embodiment 1.

FIG. 1 is a diagram showing an example of a projection system 100 of Embodiment 1. As shown in FIG. 1, the projection system 100 includes a projection apparatus 10 and an information terminal 80. A control device according to the embodiment of the present invention is applied to, for example, the projection apparatus 10. The projection apparatus 10 is a projection apparatus capable of performing projection to a projection target object 6.

A projection target object 6 is an object such as a screen having a projection surface on which a projection image is displayed by the projection apparatus 10. In the example shown in FIG. 1, the projection surface of the projection target object 6 is a rectangular plane. It is assumed that upper, lower, left, and right sides of the projection target object 6 in FIG. 1 are upper, lower, left, and right sides of the actual projection target object 6.

A projection range 11 shown by a one dot chain line is a region irradiated with projection light by the projection apparatus 10, in the projection target object 6. The projection range 11 is a part or the entirety of a projectable range within which the projection can be performed by the projection apparatus 10. In the example shown in FIG. 1, the projection range 11 is rectangular.

The information terminal 80 is an information terminal, such as a smartphone or a tablet terminal, including an imaging unit (for example, an imaging module 85 in FIG. 6) and a display unit 86. An application that causes the display unit 86 to display, in a case where a specific image is included in a captured image obtained by the imaging unit, a superimposition image in which predetermined augmented reality (AR) content is superimposed, together with the captured image, is stored (installed) in the information terminal 80.

<Configuration of Projection Apparatus 10>

Figure 2:
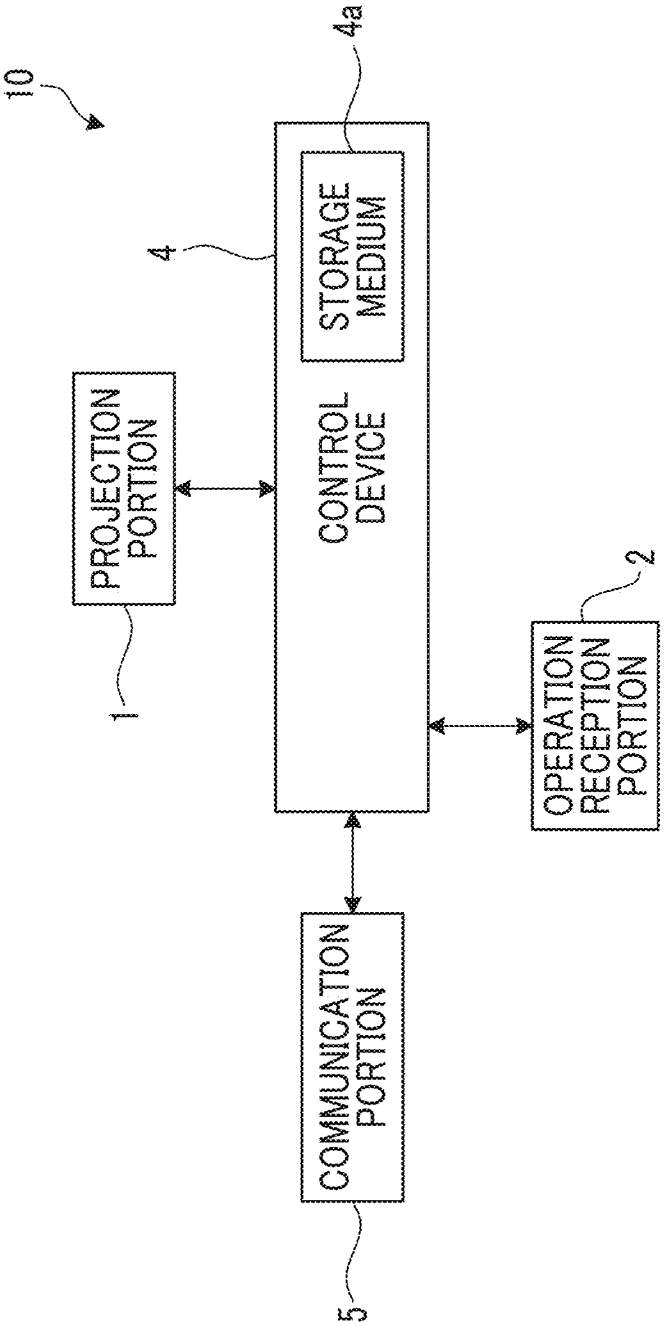
FIG. 2 is a diagram showing an example of a configuration of a projection apparatus 10.

FIG. 2 is a diagram showing an example of a configuration of the projection apparatus 10. As shown in FIG. 2, the projection apparatus 10 comprises, for example, a projection portion 1, a control device 4, and an operation reception portion 2. The projection apparatus 10 may further comprise a communication portion 5. The projection portion 1 is composed of, for example, a liquid crystal projector or a projector using liquid crystal on silicon (LCOS). Hereinafter, the projection portion 1 will be described as a liquid crystal projector.

The control device 4 is an example of a control device according to the embodiment of the present invention. The control device 4 controls projection performed by the projection apparatus 10. The control device 4 is a device including a controller composed of various processors, a communication interface (not shown) for communicating with each unit, and a storage medium 4*a* such as a hard disk, a solid state drive (SSD), or a read-only memory (ROM) and integrally controls the projection portion 1. Examples of the various processors of the controller of the control device 4 include a central processing unit (CPU) that is a general-purpose processor performing various types of processing by executing a program, a programmable logic device (PLD) such as a field programmable gate array (FPGA) that is a processor having a circuit configuration changeable after manufacture, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The controller of the control device 4 may be composed of one of the various processors or may be composed of a combination of two or more processors of the same type or different types (for example, a combination of a plurality of FPGAs or a combination of a CPU and an FPGA).

The operation reception portion 2 detects an instruction from a user (user instruction) by receiving various operations from the user. The operation reception portion 2 may be a button, a key, a joystick, or the like provided in the control device 4 or may be a reception unit or the like that receives a signal from a remote controller that performs remote control of the control device 4.

The communication portion 5 is a communication interface capable of communicating with another device. The communication portion 5 may be a wired communication interface that performs wired communication, or may be a wireless communication interface that performs wireless communication.

Figure 4:
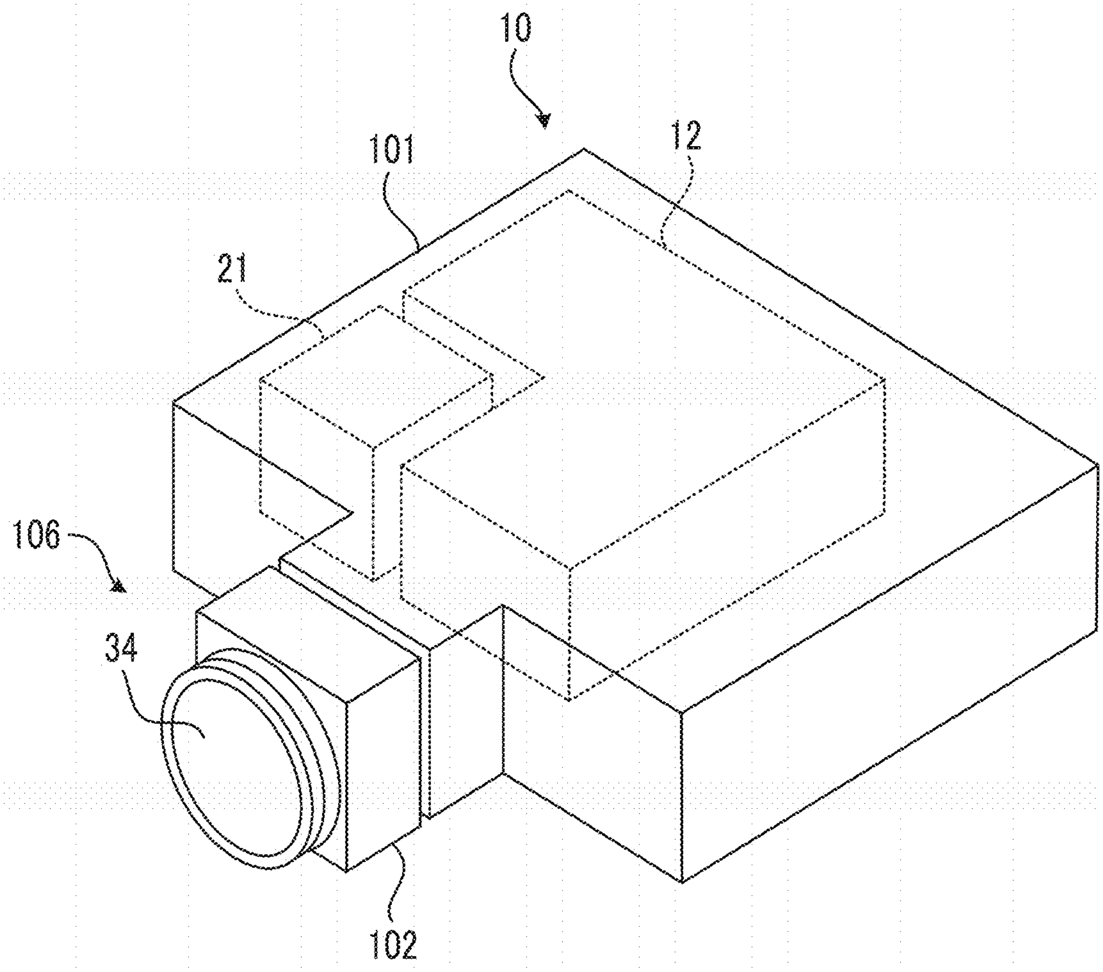
FIG. 4 is a diagram showing an example of an exterior configuration of the projection apparatus 10.
Figure 5:
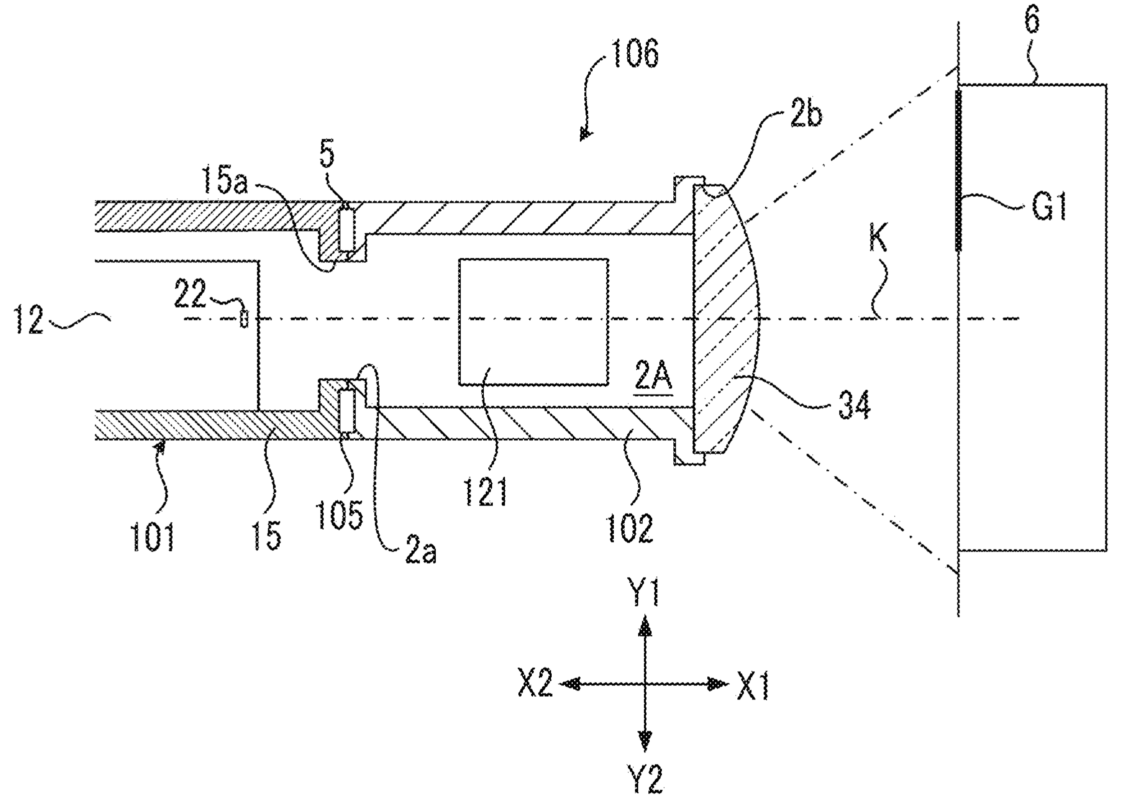
FIG. 5 is a schematic cross-sectional view of a part of an optical unit 106 of the projection apparatus 10 shown in FIG. 4.

It should be noted that the projection portion 1, the control device 4, the operation reception portion 2, and the communication portion 5 are implemented by, for example, one device (for example, refer to FIGS. 4 and 5). Alternatively, the projection portion 1, the control device 4, the operation reception portion 2, and the communication portion 5 may be implemented by a plurality of devices that can cooperate by performing communication with each other.

<Internal Configuration of Projection Portion 1>

Figure 3:
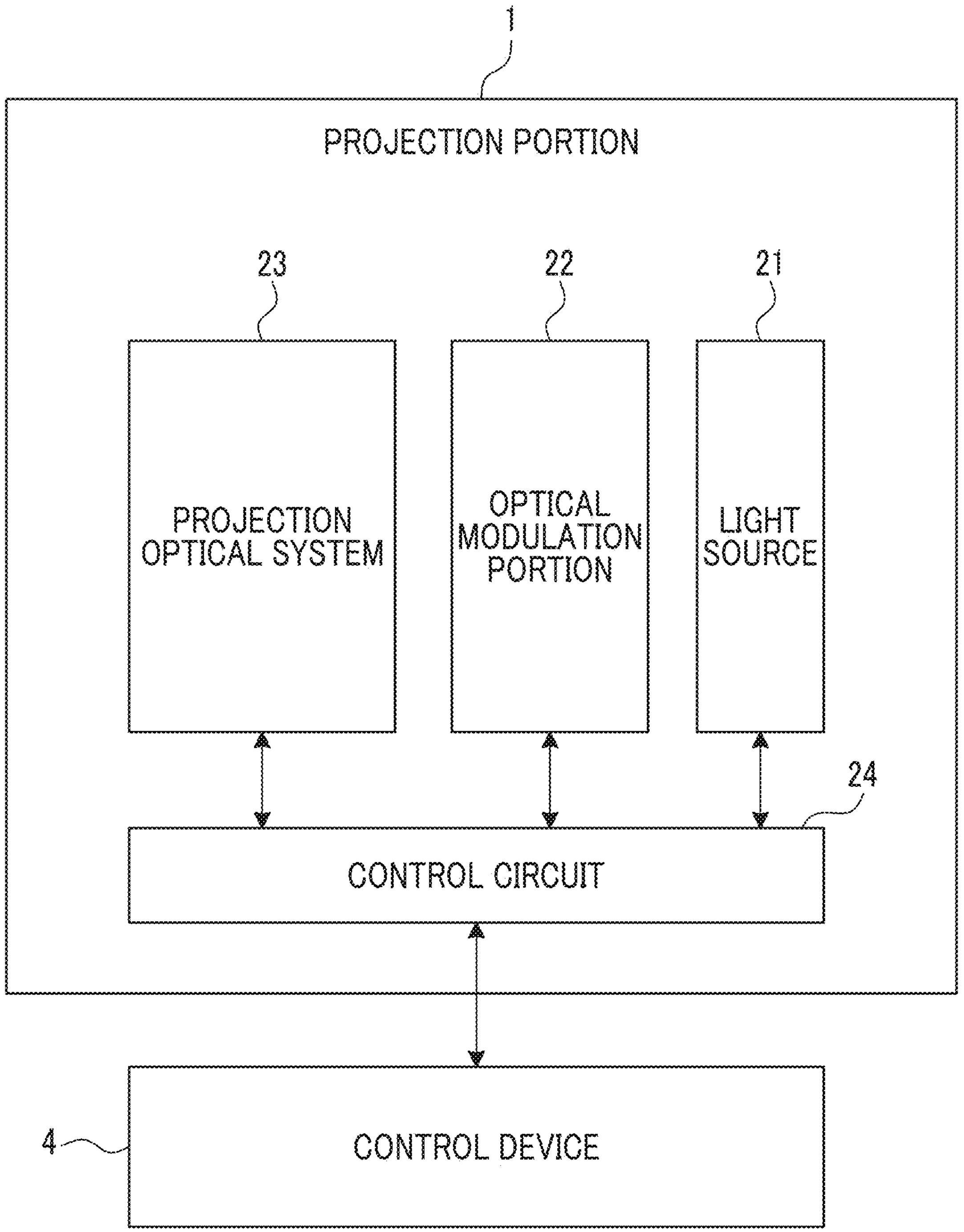
FIG. 3 is a schematic diagram showing an example of an internal configuration of a projection portion 1.

FIG. 3 is a schematic diagram showing an example of an internal configuration of the projection portion 1. As shown in FIG. 3, the projection portion 1 of the projection apparatus 10 shown in FIG. 2 comprises a light source 21, an optical modulation portion 22, a projection optical system 23, and a control circuit 24. The light source 21 includes a light emitting element such as a laser or a light emitting diode (LED) and emits, for example, white light.

The optical modulation portion 22 is composed of three liquid crystal panels (optical modulation elements) that emit each color image by modulating, based on image information, light of each color which is emitted from the light source 21 and separated into three colors, red, blue, and green, by a color separation mechanism, not shown, and a dichroic prism that mixes color images emitted from the three liquid crystal panels and that emits the mixed color image in the same direction. Each color image may be emitted by respectively mounting filters of red, blue, and green in the three liquid crystal panels and modulating the white light emitted from the light source 21 via each liquid crystal panel.

The light from the light source 21 and the optical modulation portion 22 is incident on the projection optical system 23. The projection optical system 23 includes at least one lens and is composed of, for example, a relay optical system. The light that has passed through the projection optical system 23 is projected to the projection target object 6.

In the projection target object 6, a region irradiated with the light transmitted through the entire range of the optical modulation portion 22 is the projectable range within which the projection can be performed by the projection portion 1. In the projectable range, a region irradiated with the light actually transmitted through the optical modulation portion 22 is the projection range 11 of the projection portion 1. For example, in the projectable range, a size, a position, and a shape of the projection range of the projection portion 1 are changed by controlling a size, a position, and a shape of a region through which the light is transmitted in the optical modulation portion 22.

The control circuit 24 controls the light source 21, the optical modulation portion 22, and the projection optical system 23 based on display data input from the control device 4 to project an image based on the display data to the projection target object 6. The display data input into the control circuit 24 is composed of three pieces of data including red display data, blue display data, and green display data.

In addition, the control circuit 24 enlarges or reduces a projection range of the projection portion 1 by changing the projection optical system 23 based on a command input from the control device 4. In addition, the control device 4 may move the projection range of the projection portion 1 by changing the projection optical system 23 based on an operation received by the operation reception portion 2 from the user.

In addition, the projection apparatus 10 comprises a shift mechanism that mechanically or optically moves the projection range of the projection portion 1 while maintaining an image circle of the projection optical system 23. The image circle of the projection optical system 23 is a region in which the projection light incident on the projection optical system 23 appropriately passes through the projection optical system 23 in terms of light fall-off, color separation, edge part curvature, and the like.

The shift mechanism is implemented by at least one of an optical system shift mechanism that performs optical system shifting, or an electronic shift mechanism that performs electronic shifting.

The optical system shift mechanism is, for example, a mechanism (for example, refer to FIGS. 5 and 23) that moves the projection optical system 23 in a direction perpendicular to an optical axis, or a mechanism that moves the optical modulation portion 22 in the direction perpendicular to the optical axis instead of moving the projection optical system 23. In addition, the optical system shift mechanism may perform the movement of the projection optical system 23 and the movement of the optical modulation portion 22 in combination with each other.

The electronic shift mechanism is a mechanism that performs pseudo shifting of the projection range by changing a range through which the light is transmitted in the optical modulation portion 22.

In addition, the projection apparatus 10 may comprise a projection direction changing mechanism that moves the image circle of the projection optical system 23 and the projection range. The projection direction changing mechanism is a mechanism that changes a projection direction of the projection portion 1 by changing an orientation of the projection portion 1 via mechanical rotation (for example, refer to FIG. 23).

<Mechanical Configuration of Projection Apparatus 10>

FIG. 4 is a diagram showing an example of an exterior configuration of the projection apparatus 10. FIG. 5 is a schematic cross-sectional view of a part of the optical unit 106 of the projection apparatus 10 shown in FIG. 4. FIG. 5 shows a cross section in a plane along an optical path of light emitted from a body part 101 shown in FIG. 4.

As shown in FIG. 4, the projection apparatus 10 comprises the body part 101 and the optical unit 106 that is provided to protrude from the body part 101. In the configuration shown in FIG. 4, the operation reception portion 2; the control device 4; the light source 21, the optical modulation portion 22, and the control circuit 24 in the projection portion 1; and the communication portion 5 are provided in the body part 101. The projection optical system 23 in the projection portion 1 is provided in the optical unit 106.

The optical unit 106 comprises a first member 102 supported by the body part 101. The optical unit 106 may be configured to be attachable to and detachable from the body part 101 (in other words, configured to be interchangeable).

As shown in FIG. 5, the body part 101 includes a housing 15 in which an opening 15*a* for passing light is formed in a part connected to the optical unit 106.

As shown in FIG. 4, the light source 21 and an optical modulation unit 12 including the optical modulation portion 22 (refer to FIG. 3) that generates an image by spatially modulating the light emitted from the light source 21 based on input image data are provided inside the housing 15 of the body part 101. The light emitted from the light source 21 is incident on the optical modulation portion 22 of the optical modulation unit 12 and is spatially modulated and emitted by the optical modulation portion 22.

As shown in FIG. 5, the image formed by the light spatially modulated by the optical modulation unit 12 is incident on the optical unit 106 by passing through the opening 15*a* of the housing 15 and is projected to the projection target object 6. Accordingly, an image G1 is visible from an observer.

As shown in FIG. 5, the optical unit 106 comprises the first member 102 having a hollow portion 2A connected to an inside of the body part 101, a first optical system 121 disposed in the hollow portion 2A, a lens 34, and a first shift mechanism 105.

The first member 102 is a member having, for example, a rectangular cross-sectional exterior, in which an opening 2*a* and an opening 2*b* are formed in surfaces parallel to each other. The first member 102 is supported by the body part 101 in a state where the opening 2*a* is disposed at a position facing the opening 15*a* of the body part 101. The light emitted from the optical modulation portion 22 of the optical modulation unit 12 of the body part 101 is incident into the hollow portion 2A of the first member 102 through the opening 15*a* and the opening 2*a*.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, a direction from the front to the back of the page of FIG. 5 and its opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and to the direction Z will be referred to as a direction Y. In the direction Y, an upward direction in FIG. 5 will be referred to as a direction Y1, and a downward direction in FIG. 5 will be referred to as a direction Y2. In the example in FIG. 5, the projection apparatus 10 is disposed such that the direction Y2 is a vertical direction.

The projection optical system 23 shown in FIG. 3 is composed of the first optical system 121 and the lens 34 in the example in FIG. 5. An optical axis K of this projection optical system 23 is shown in FIG. 5. The first optical system 121 and the lens 34 are disposed in this order from an optical modulation portion 22 side along the optical axis K.

The first optical system 121 includes at least one lens and guides the light that is incident on the first member 102 from the body part 101 and that travels in the direction X1 to the lens 34.

The lens 34 closes the opening 2*b* formed in an end part of the first member 102 on a direction X1 side and is disposed in the end part. The lens 34 projects the light incident from the first optical system 121 to the projection target object 6.

The first shift mechanism 105 is a mechanism for moving the optical axis K of the projection optical system (in other words, the optical unit 106) in a direction (direction Y in FIG. 5) perpendicular to the optical axis K. Specifically, the first shift mechanism 105 is configured to be capable of changing a position of the first member 102 in the direction Y with respect to the body part 101. The first shift mechanism 105 may manually move the first member 102 or electrically move the first member 102.

FIG. 5 shows a state where the first member 102 is moved as far as possible to a direction Y1 side by the first shift mechanism 105. By moving the first member 102 in the direction Y2 via the first shift mechanism 105 from the state shown in FIG. 5, a relative position between a center of the image (in other words, a center of a display surface) formed by the optical modulation portion 22 and the optical axis K changes, and the image G1 projected to the projection target object 6 can be shifted (translated) in the direction Y2.

The first shift mechanism 105 may be a mechanism that moves the optical modulation portion 22 in the direction Y instead of moving the optical unit 106 in the direction Y. Even in this case, the image G1 projected to the projection target object 6 can be moved in the direction Y.

<Hardware Configuration of Information Terminal 80>

Figure 6:
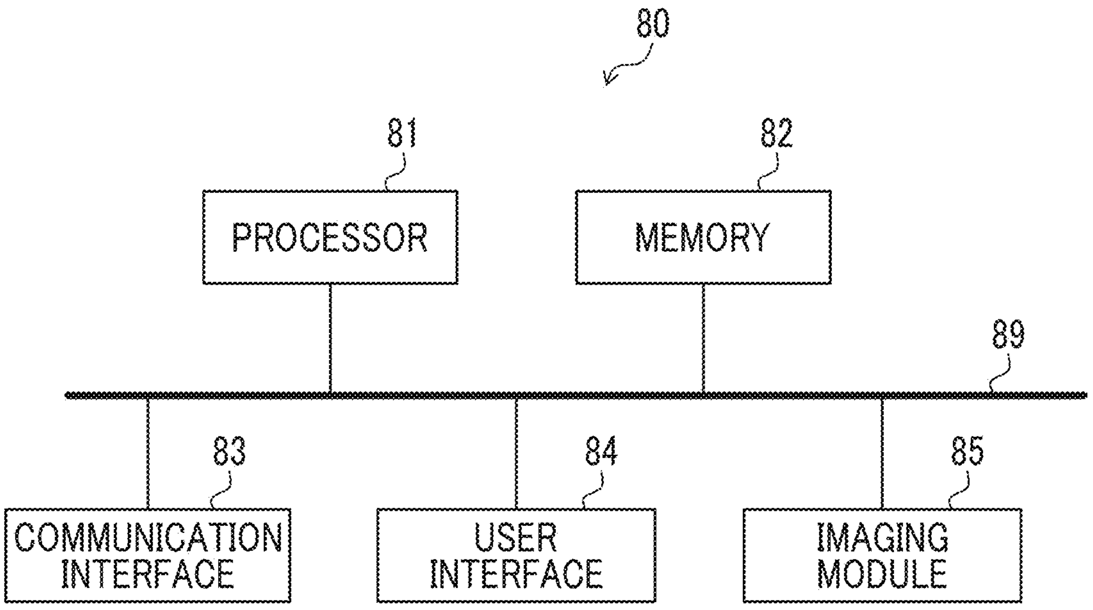
FIG. 6 is a diagram showing an example of a hardware configuration of an information terminal 80.

FIG. 6 is a diagram showing an example of a hardware configuration of the information terminal 80. As shown in FIG. 5, the information terminal 80 shown in FIG. 1 comprises a processor 81, a memory 82, a communication interface 83, a user interface 84, and the imaging module 85. The processor 81, the memory 82, the communication interface 83, the user interface 84, and the imaging module 85 are connected to each other by, for example, a bus 89.

The processor 81 is a circuit that performs signal processing, and is, for example, a CPU that controls the entire information terminal 80. The processor 81 may be implemented by other digital circuits such as an FPGA and a digital signal processor (DSP). In addition, the processor 81 may be implemented by combining a plurality of digital circuits.

The memory 82 includes, for example, a main memory and an auxiliary memory. The main memory is, for example, a random-access memory (RAM). The main memory is used as a work area of the processor 81.

The auxiliary memory is, for example, a non-volatile memory such as a magnetic disk, an optical disc, or a flash memory. Various programs for operating the information terminal 80 are stored in the auxiliary memory. The programs stored in the auxiliary memory are loaded into the main memory and executed by the processor 81.

In addition, the auxiliary memory may include a portable memory that can be attached to and detached from the information terminal 80. Examples of the portable memory include a memory card such as a universal serial bus (USB) flash drive or a secure digital (SD) memory card, and an external hard disk drive.

The communication interface 83 is a communication interface that performs communication with an external device of the information terminal 80. The communication interface 83 is controlled by the processor 81. The communication interface 83 may be a wired communication interface that performs wired communication or a wireless communication interface that performs wireless communication, or may include both of the wired communication interface and the wireless communication interface.

The user interface 84 includes, for example, an input device that receives operation input from a user, and an output device that outputs information to the user. The input device can be implemented by, for example, a pointing device (for example, a mouse), a key (for example, a keyboard), or a remote controller. The output device can be implemented by, for example, a display or a speaker. In addition, the input device and the output device may be implemented by a touch panel or the like. The user interface 84 is controlled by the processor 81. The display unit 86 of the information terminal 80 shown in FIG. 1 is implemented by, for example, a touch panel included in the user interface 84.

The imaging module 85 is an imaging unit including an imaging lens or an imaging element. As the imaging element, for example, a complementary metal-oxide-semiconductor (CMOS) image sensor can be used.

<Image Projection and Playback of Augmented Reality Content>

Figure 7:
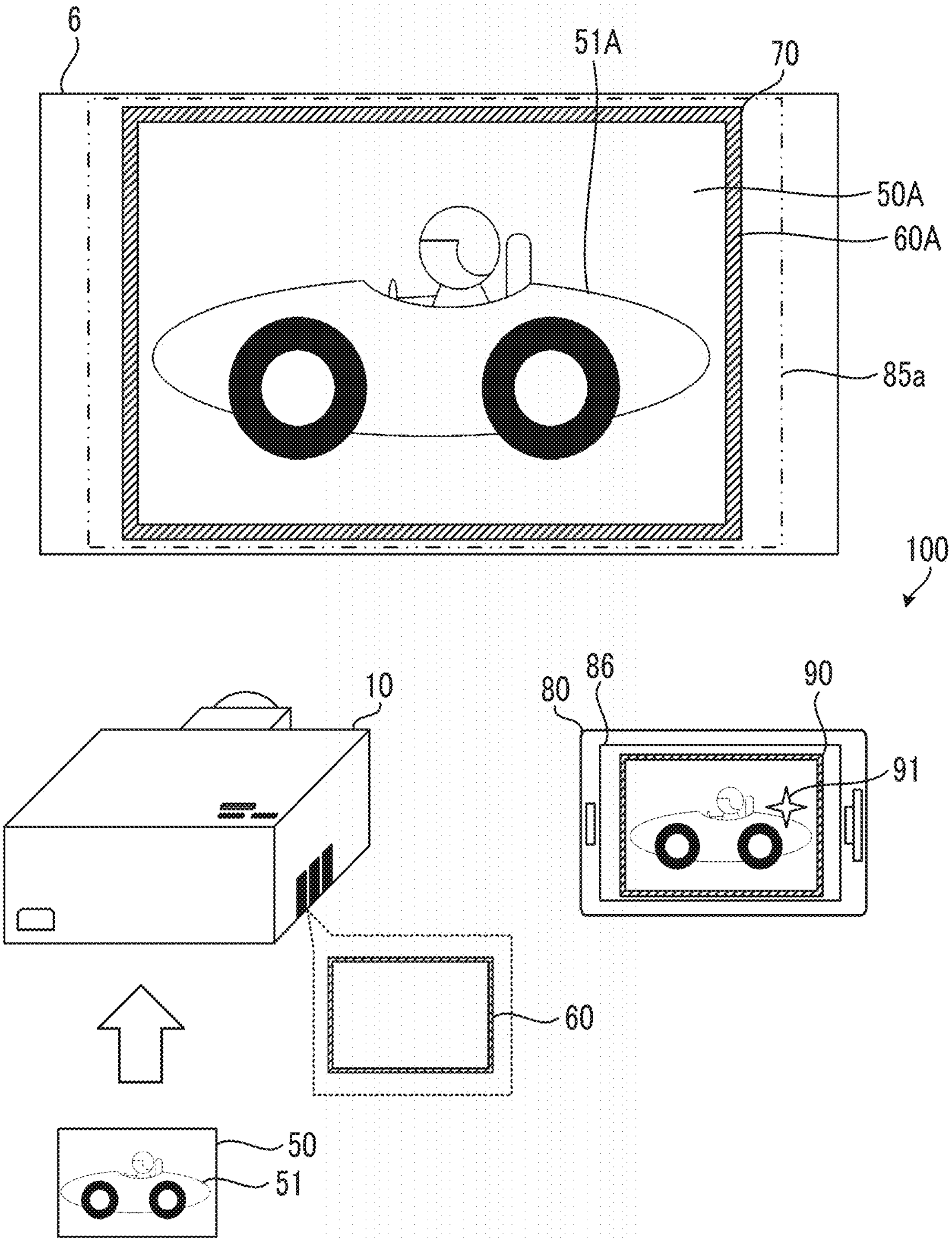
FIG. 7 is a diagram showing an example of image projection and playback of augmented reality content.

FIG. 7 is a diagram showing an example of image projection and playback of augmented reality content. First image data representing a projection target image 50 is input to the projection apparatus 10. In the example of FIG. 7, the projection target image 50 is an image including a car image 51 which is a photographic image or an illustration image of a sports car. The projection apparatus 10 stores the second image data representing a frame image 60 in the storage medium 4*a*. In the example of FIG. 7, the frame image 60 is a frame image having a hollow rectangular shape.

The control device 4 of the projection apparatus 10 generates third image data representing projection image 70 based on the first image data and the second image data. Then, the control device 4 outputs the generated third image data to the projection portion 1 of the projection apparatus 10. As a result, the projection image 70 based on the third image data is projected to the projection range 11.

The projection image 70 is an example of a third image represented by the third image data. In the example of FIG. 7, the projection image 70 is an image in which the projection target image 50 is superimposed on an inside of the frame image 60, which is the frame image having a hollow rectangular shape. The projection image 70 includes a projection target image 50A and a frame image 60A.

The projection target image 50A is a first image based on the first image data in the projection image 70. A car image 51A is an image based on the car image 51 in the projection target image 50A. In the example of FIG. 7, since the projection image 70 is generated such that the projection target image 50 is included as it is inside the frame image 60, the projection target image 50A is the same as the projection target image 50.

It should be noted that the projection image 70 is not limited to this, and for example, the frame image 60 may be substituted for an outer peripheral region (for example, a region with a certain width inside the projection target image 50 and along an outer periphery of the projection target image 50) of the projection target image 50. In this case, the projection target image 50A in the projection image 70 is an image obtained by excluding the outer peripheral region of the projection target image 50 from the projection target image 50.

The frame image 60A is a second image based on the second image data in the projection image 70. In the example of FIG. 7, since the projection image 70 is generated such that the frame image 60 is included as it is outside the projection target image 50, the frame image 60A is the same as the frame image 60.

An imaging range 85*a* indicates an imaging range of the imaging module 85 of the information terminal 80. That is, a captured image representing the imaging range 85*a* is obtained by imaging using the imaging module 85 of the information terminal 80.

An application that causes the display unit 86 to display, in a case where the car image 51A is included in the captured image obtained by the imaging module 85, a superimposition image 90 in which a gloss image 91 is superimposed on a specific part of the car image 51A in the image, together with the captured image, is stored (installed) in the information terminal 80. In the example of FIG. 7, the entire projection image 70 is imaged by the information terminal 80, and the superimposition image 90 in which the gloss image 91 is superimposed on a part with the car image 51A of the projection image 70 is displayed on the display unit 86.

The frame image 60A is an image indicating that the projection image 70 is associated with the augmented reality content. The augmented reality content is an example of specific content. For example, a user of the information terminal 80 is notified in advance that the augmented reality content is played back in a case where the image surrounded by the frame image 60A among the images projected to the projection target object 6 is captured.

The user of the information terminal 80 recognizes that the augmented reality content is associated with the projection image 70 by looking at the frame image 60A of the projection image 70 projected from the projection apparatus 10, and captures the projection image 70 by using the information terminal 80. As a result, the superimposition image 90 in which the gloss image 91 is superimposed on the projection image 70 is displayed on the display unit 86.

In addition, in the projection image 70, the frame image 60A is disposed to be in contact with at least a part of an outer periphery of the projection target image 50A (first image) and not to include an internal region of the projection target image 50A. The outer periphery is an end part having no width. In the example of FIG. 7, the frame image 60A surrounds the projection target image 50A such that the frame image 60A is in contact with the entire outer periphery of the projection target image 50A.

As a result, it is possible to notify an observer of the projection image 70 that the augmented reality content is associated with the projection image 70 while suppressing a decrease in visibility of the projection target image 50A, which is original projection target content.

The frame image 60A need only surround the projection target image 50A, and may not be in contact with the projection target image 50A. For example, the projection image 70 may be an image in which the frame image 60A is disposed to have a slight interval with respect to the projection target image 50A and to surround the projection target image 50A. The surrounding of the projection target image 50A includes, for example, sandwiching the projection target image 50A as in the example of FIG. 8.

Figure 8:
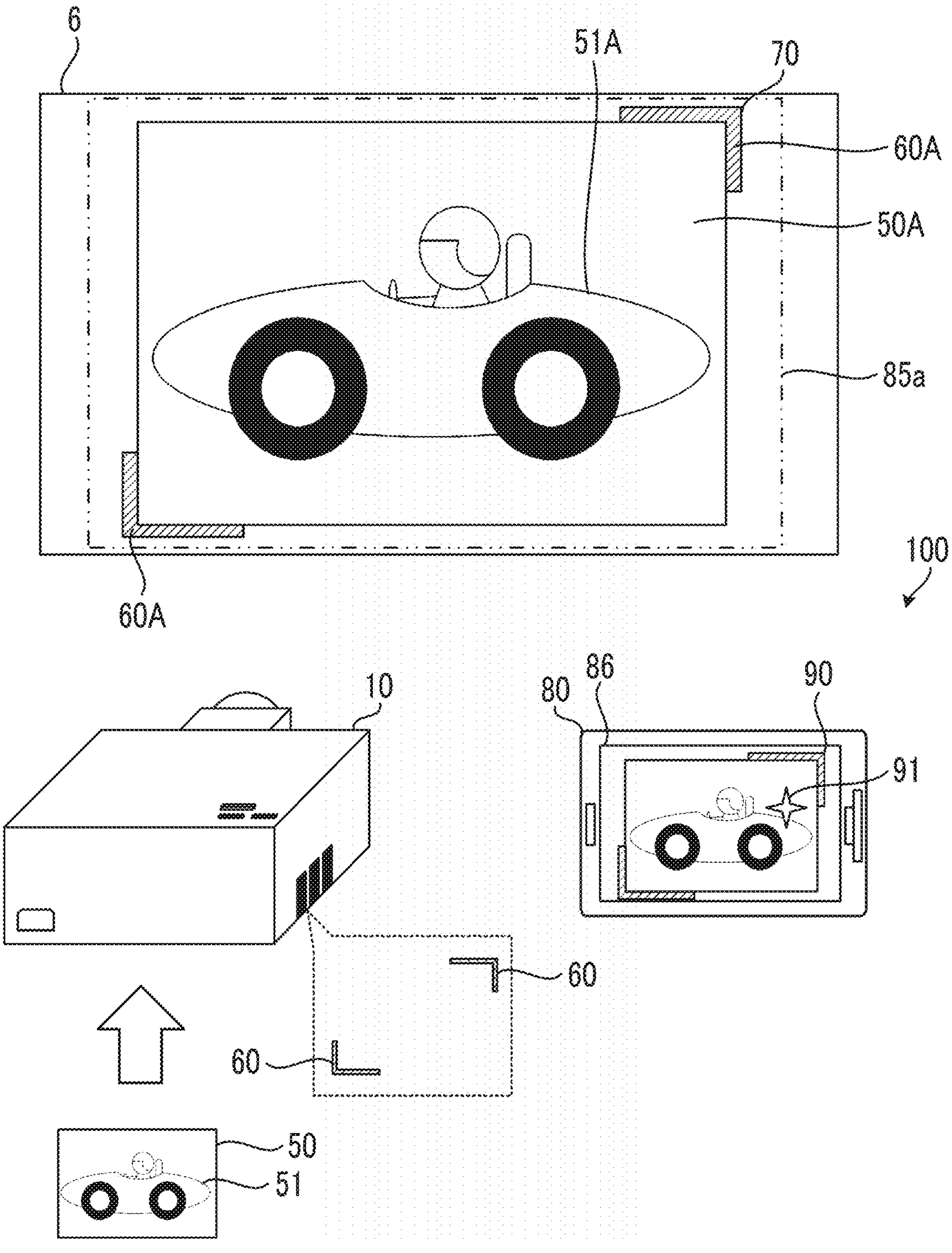
FIG. 8 is a diagram showing another example of the projection and the playback of the augmented reality content performed by the projection apparatus 10.

FIG. 8 is a diagram showing another example of the projection and the playback of the augmented reality content performed by the projection apparatus 10. In the example of FIG. 8, the frame image 60 is two L-shaped frame images. In addition, the projection image 70 is an image in which the frame image 60 is superimposed so as to be in contact with an upper right corner and a lower left corner of the projection target image 50 having a rectangular shape. That is, in the projection image 70, the frame image 60A surrounds the projection target image 50A so as to be in contact with a part of the outer periphery of the projection target image 50A.

<Image Projection and Playback of Augmented Reality Content Based on Input of Information on Projection Region>

Figure 9:
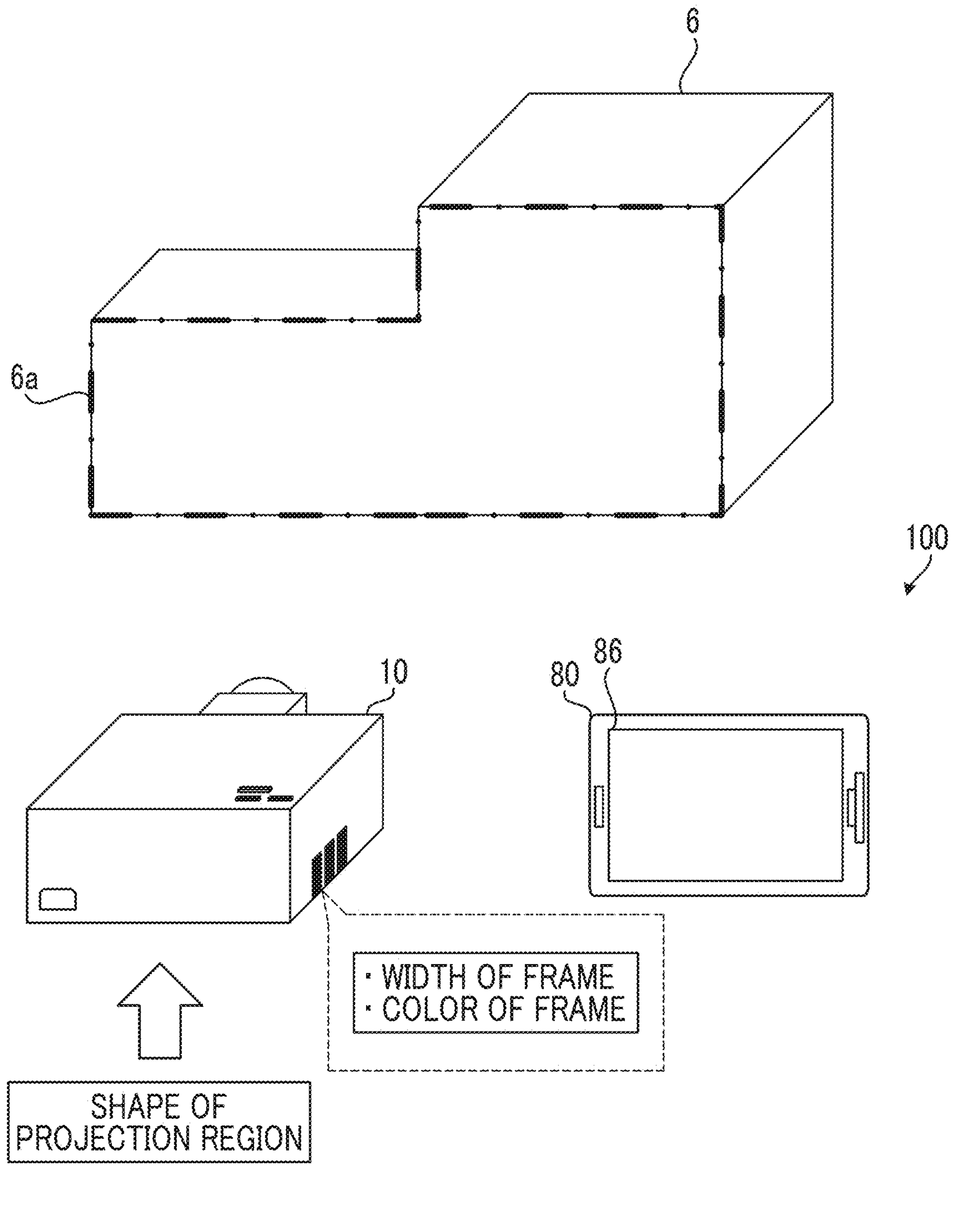
FIG. 9 is a diagram showing an example of input of information on a projection region.
Figure 10:
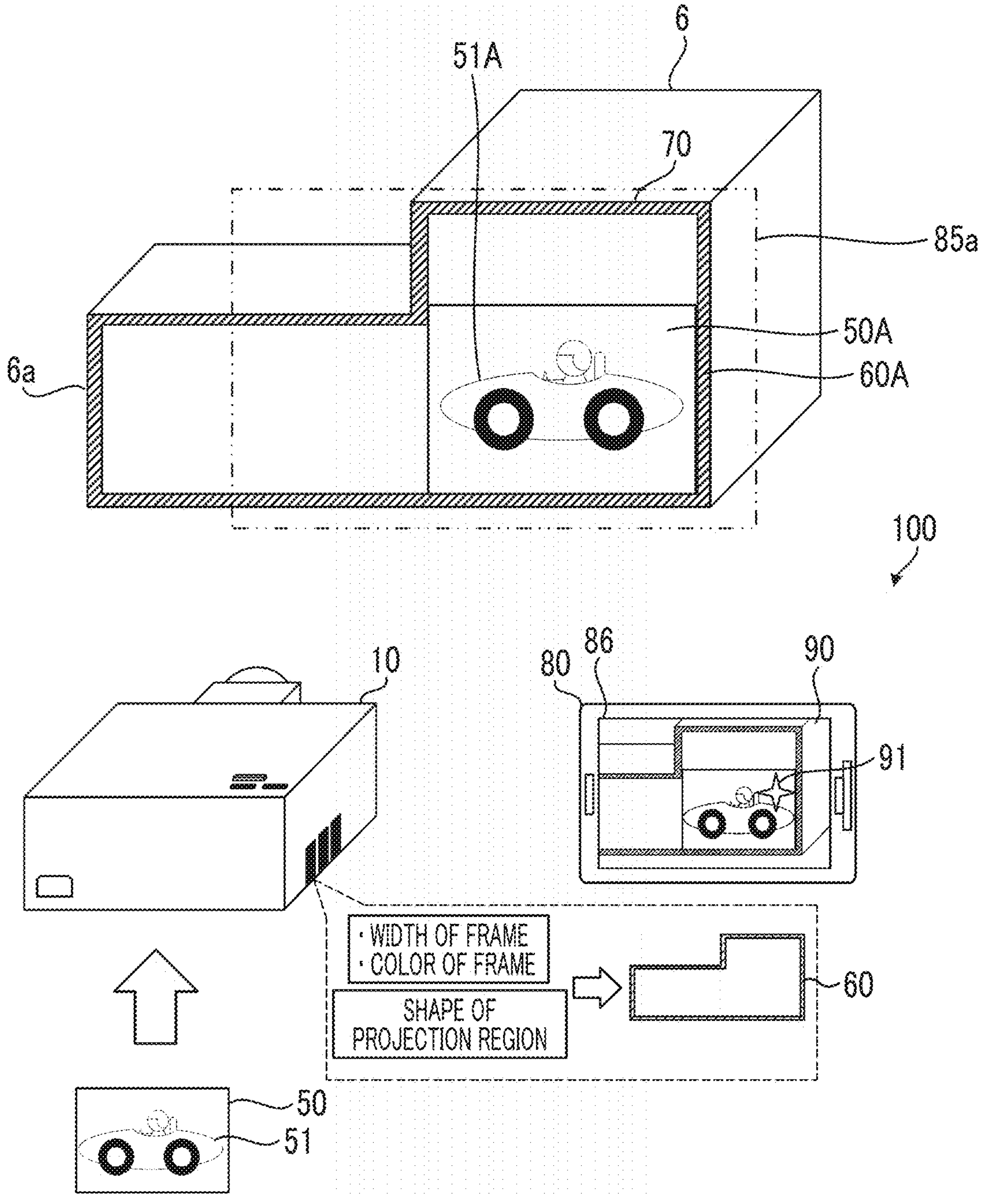
FIG. 10 is a diagram showing an example of image projection and playback of augmented reality content based on the input of information on the projection region.

FIG. 9 is a diagram showing an example of input of the information on a projection region. FIG. 10 is a diagram showing an example of image projection and the playback of the augmented reality content based on the input of the information on the projection region. The projection region 6*a* in FIGS. 9 and 10 is the projection surface of the projection target object 6. In the example of FIG. 9, the projection region 6*a* has an L-shape instead of a rectangular shape.

The control device 4 of the projection apparatus 10 may receive input of information on a shape of the projection region 6*a* of the projection target object 6. The projection region 6*a* is an example of a display region in which the projection image 70 (third image) is displayed. The input of the information on the shape of the projection region 6*a* is performed, for example, via the operation reception portion 2.

In addition, in the example of FIG. 9, the projection apparatus 10 stores information indicating a width, a color, and the like of a frame as the second image data for generating the frame image 60 in the storage medium 4*a*. As described above, the second image data is not limited to the image data representing the predetermined frame image 60, and may be data for generating the frame image 60, such as the color, the width, and the like of the frame image.

As shown in FIG. 10, the control device 4 generates third image data based on the information on the shape of the input projection region 6*a*, the first image data representing the projection target image 50, and the second image data representing the width, the color, and the like of the frame. Specifically, the control device 4 generates the frame image 60 having the width and the color indicated by the second image data along the shape of the projection region 6*a* indicated by the input information. Then, the control device 4 generates the third image data representing the projection image 70 in which the projection target image 50 is superimposed on the inside of the frame image 60, and outputs the generated third image data to the projection portion 1.

As a result, the projection image 70 having a shape that matches the projection region 6*a* of the projection target object 6 is projected from the projection apparatus 10 to the projection target object 6.

<Another Example of Generating Method of Frame Image 60>

The control device 4 may generate the frame image 60 based on the color of the input first image data (projection target image 50). For example, the control device 4 may determine a color of a part (outer peripheral region) adjacent to the outer periphery of the projection target image 50 in the projection target image 50, and may generate the frame image 60 having a color different from the determined color.

As a result, it is possible to avoid a case where a color of an outer peripheral region of the projection target image 50A in the projection image 70 is the same as a color of the frame image 60A, and it is possible to improve visibility of the frame image 60A in the projection image 70. As a result, it is possible to suppress a situation in which the observer of the projection image 70 does not notice that the augmented reality content is associated with the projection image 70.

<Configuration in which Augmented Reality Content is Associated with Frame Image 60 (Second Image)>

A configuration, in which an application that displays, in a case where the car image 51A is included in the captured image, the superimposition image 90 in which the gloss image 91 is superimposed on the specific part of the car image 51A in the image, together with the captured image, is stored in the information terminal 80, that is, the augmented reality content is associated with the car image 51A (projection target image 50), has been described, but the present invention is not limited to such a configuration. For example, a configuration in which the augmented reality content is associated with the frame image 60 (second image) may be adopted.

Specifically, the application stored in the information terminal 80 may be configured to display, in a case where the frame image 60 is included in the captured image, the superimposition image 90 in which the gloss image 91 is superimposed on a specific position (a part with the car image 51A) inside the frame image 60 in the image, together with the captured image.

In addition, the application stored in the information terminal 80 may be configured to display the superimposition image 90 in which the gloss image 91 is superimposed on the above-described specific position even in a case where only a part of the frame image 60 is included in the captured image, by deriving a positional relationship between the part of the frame image 60 and the above-described specific position based on a shape or the like of the part of the frame image 60.

<Frame Image 60 Including Identification Information>

Figure 11:
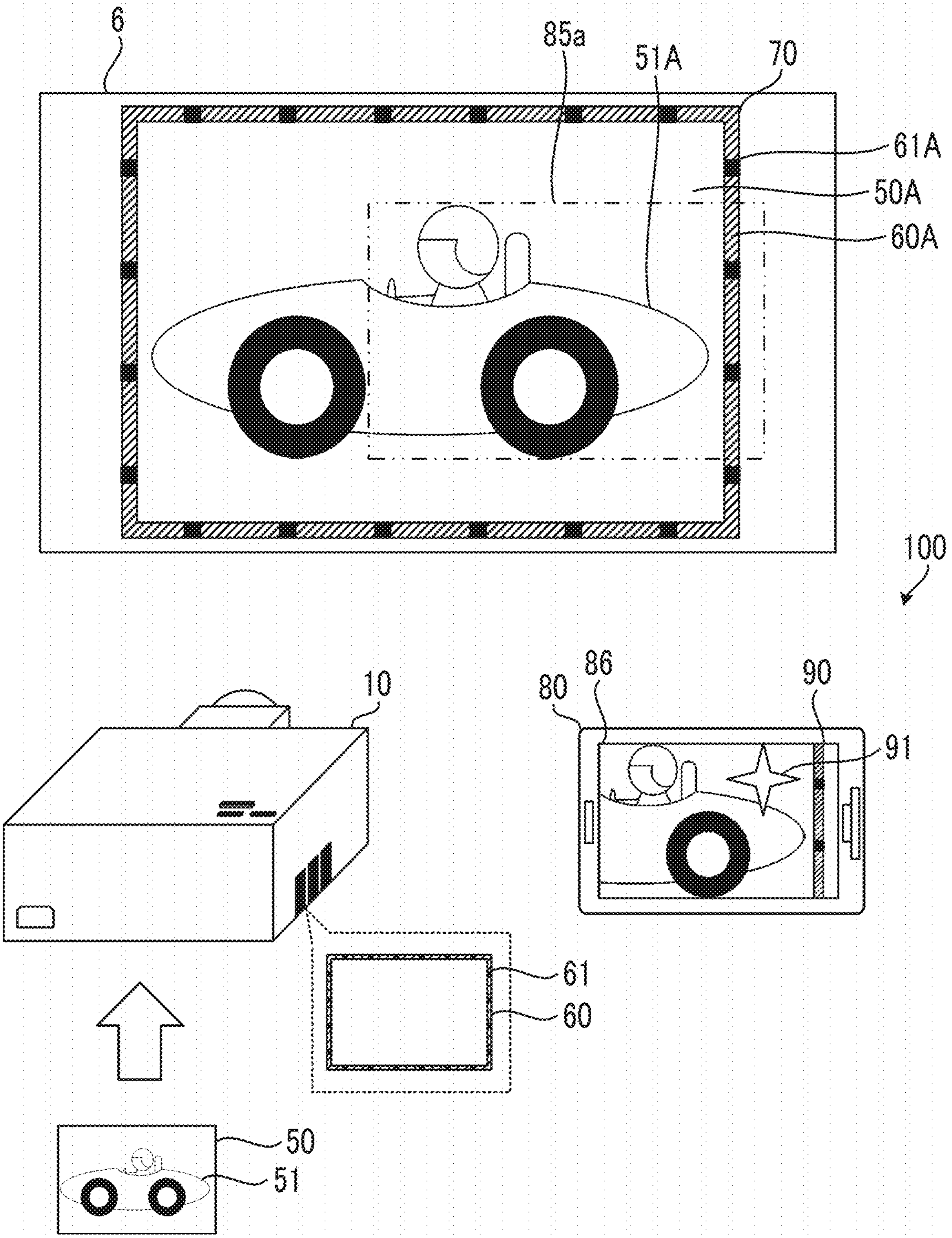
FIG. 11 is a diagram showing an example of a frame image 60 including identification information.

FIG. 11 is a diagram showing an example of the frame image 60 including identification information. In a configuration in which the augmented reality content (for example, the gloss image 91) is associated with the frame image 60, identification information 61 may be included in the frame image 60, as shown in FIG. 11.

For example, the identification information 61 is a plurality of images different from each other, which are disposed at a plurality of positions of the frame image 60. It should be noted that, in the example of FIG. 11, 20 pieces of identification information 61 are disposed at intervals from each other in the frame image 60, and in FIG. 11, only one piece of identification information 61 is denoted by a reference numeral "61" among the 20 pieces of identification information 61. The identification information 61 is an example of identification information with which it is possible to specify a relative position of the identification information 61 in the projection image 70 based on the frame image 60.

The 20 pieces of identification information 61 shown in FIG. 11 are, for example, one-dimensional codes and two-dimensional codes different from each other, and an arrangement of the 20 pieces of identification information 61 in the frame image 60 is determined in advance. As a result, the information terminal 80 can specify, for each piece of the identification information 61 included in the captured image, which position of the projection image 70 the identification information 61 is disposed at, that is, the relative position of the identification information 61 in the projection image 70.

As a result, the information terminal 80 can display the superimposition image 90 in which the gloss image 91 is superimposed on the captured image even in a case where only a part of the frame image 60A is included in the captured image obtained by the imaging module 85, based on the identification information 61 included in the part of the frame image 60A.

It should be noted that the identification information 61 is not limited to the one-dimensional code or the two-dimensional code, and may be an image having a predetermined specific color or pattern, or may be an image of a character, a number, a symbol, or the like.

In addition, even in a configuration in which the augmented reality content (for example, the gloss image 91) is associated with the projection target image 50 (first image), the information terminal 80 may display the superimposition image 90 in which the gloss image 91 is superimposed on the captured image based on the identification information 61 of the frame image 60, for example, in a case where the car image 51A is not included in the captured image or in a case where only a part of the car image 51A is included in the captured image.

<Guide of Direction Toward Car Image 51A Based on Identification Information 61>

Figure 12:
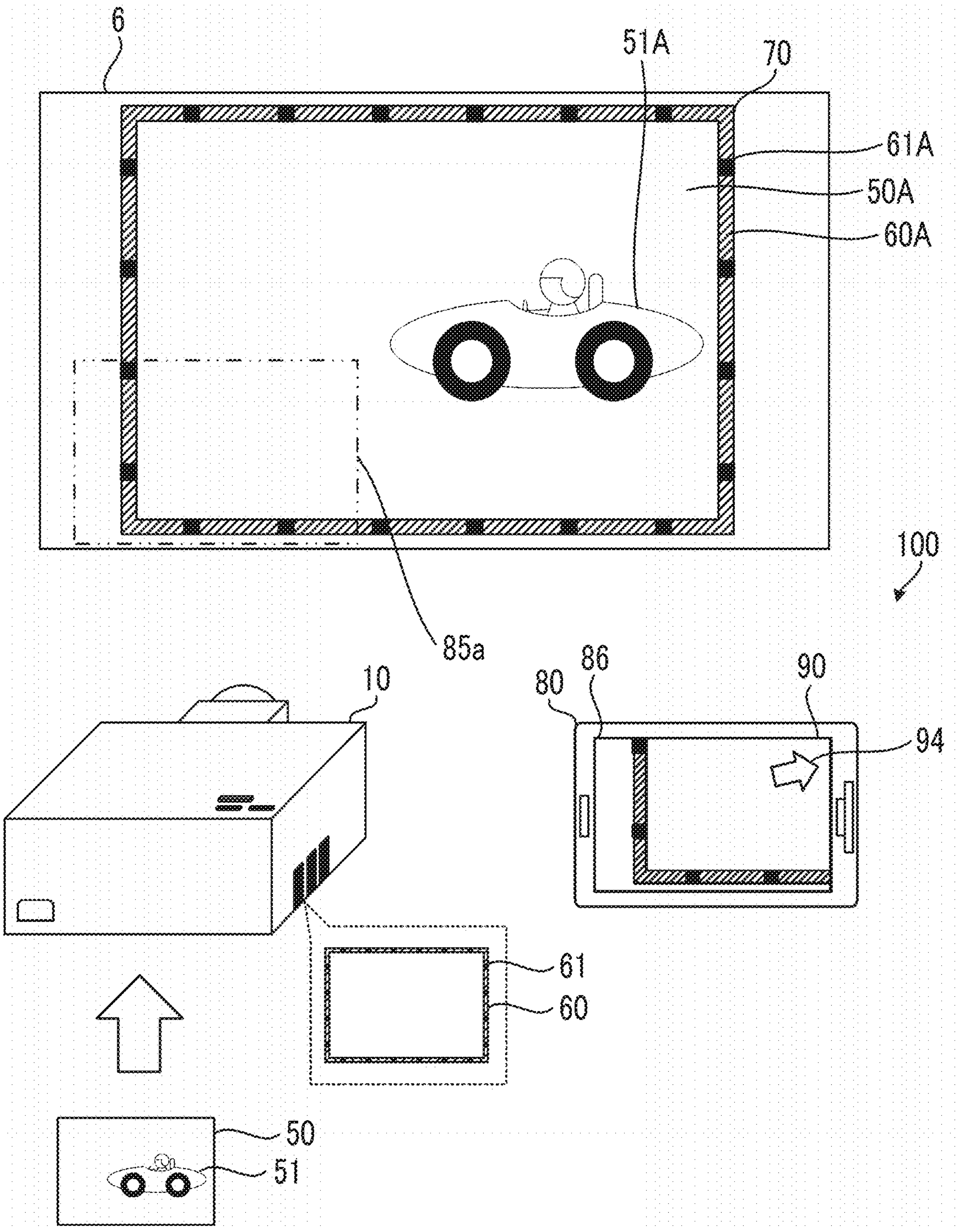
FIG. 12 is a diagram showing an example of a guide of a direction toward a car image 51A based on identification information 61.

FIG. 12 is a diagram showing an example of a guide of a direction toward the car image 51A based on the identification information 61. In the example of FIG. 12, the augmented reality content (for example, the gloss image 91) is associated with the car image 51A of the projection target image 50, but the car image 51 is not included in the imaging range 85*a*, and a part of the frame image 60A is included in the imaging range 85*a*.

In this case, the information terminal 80 may specify the direction toward the car image 51A based on the identification information 61 included in a part of the frame image 60A, and may display the superimposition image 90 in which an arrow image 94 indicating the specified direction toward the car image 51A is superimposed on the captured image. In a case where the car image 51A is included in the imaging range 85*a*, the information terminal 80 may display the superimposition image 90 in which the gloss image 91 is superimposed on the captured image instead of the arrow image 94.

As a result, the user of the information terminal 80 performs an operation of changing the imaging range 85*a* such that a region in the upper right of the current imaging range 85*a* is included, with reference to the arrow image 94. This operation is, for example, an operation of changing an orientation of the information terminal 80, an operation of moving the information terminal 80 away from the projection target object 6, or an operation of zooming out the imaging module 85.

As a result, the car image 51A is included in the imaging range 85*a*, and the superimposition image 90 including the car image 51A and the gloss image 91 is displayed.

<Playback of Augmented Reality Content According to Attribute of Augmented Reality Content>

Figure 13:
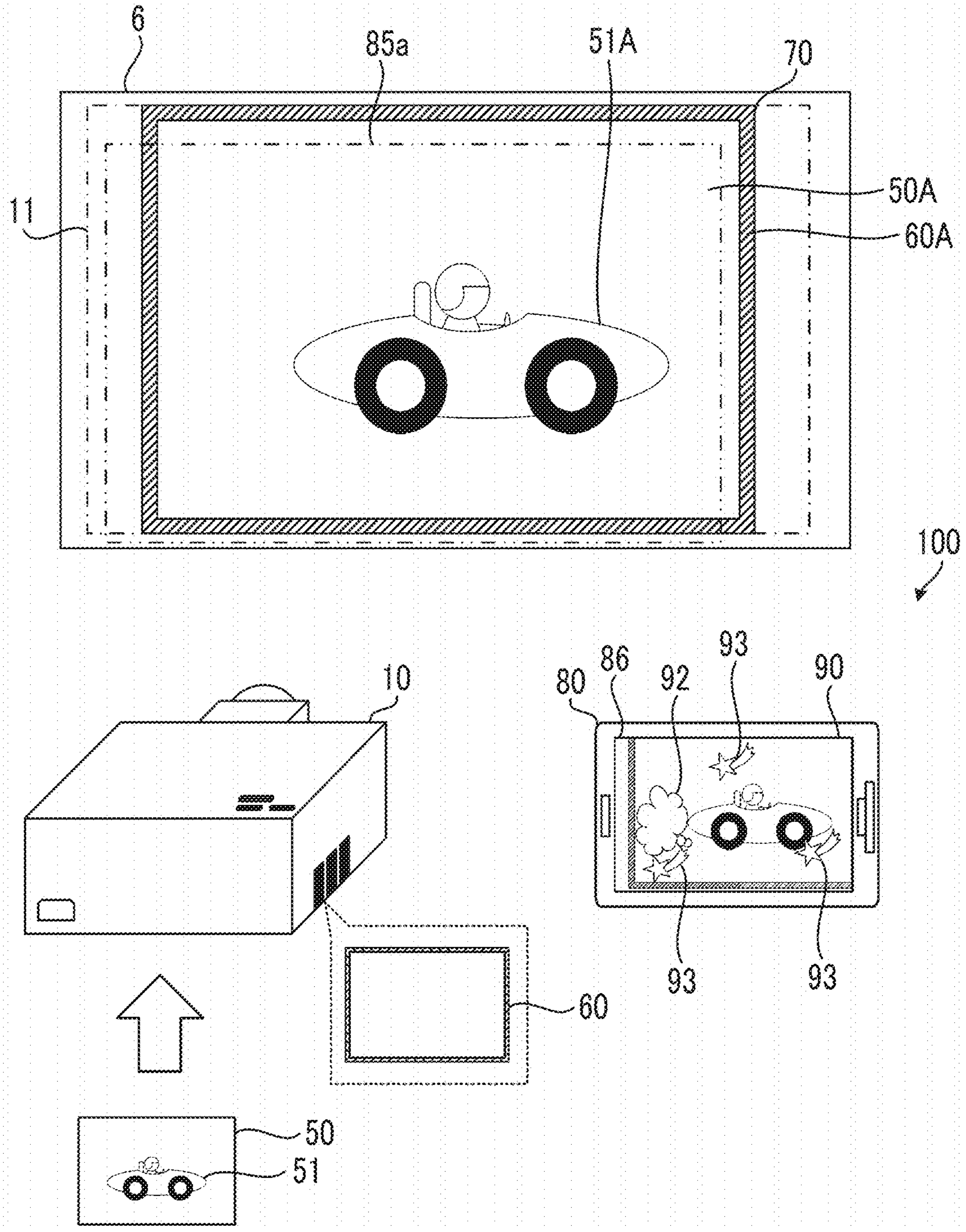
FIG. 13 is a diagram showing an example of playback of augmented reality content according to an attribute of the augmented reality content (part 1).
Figure 14:
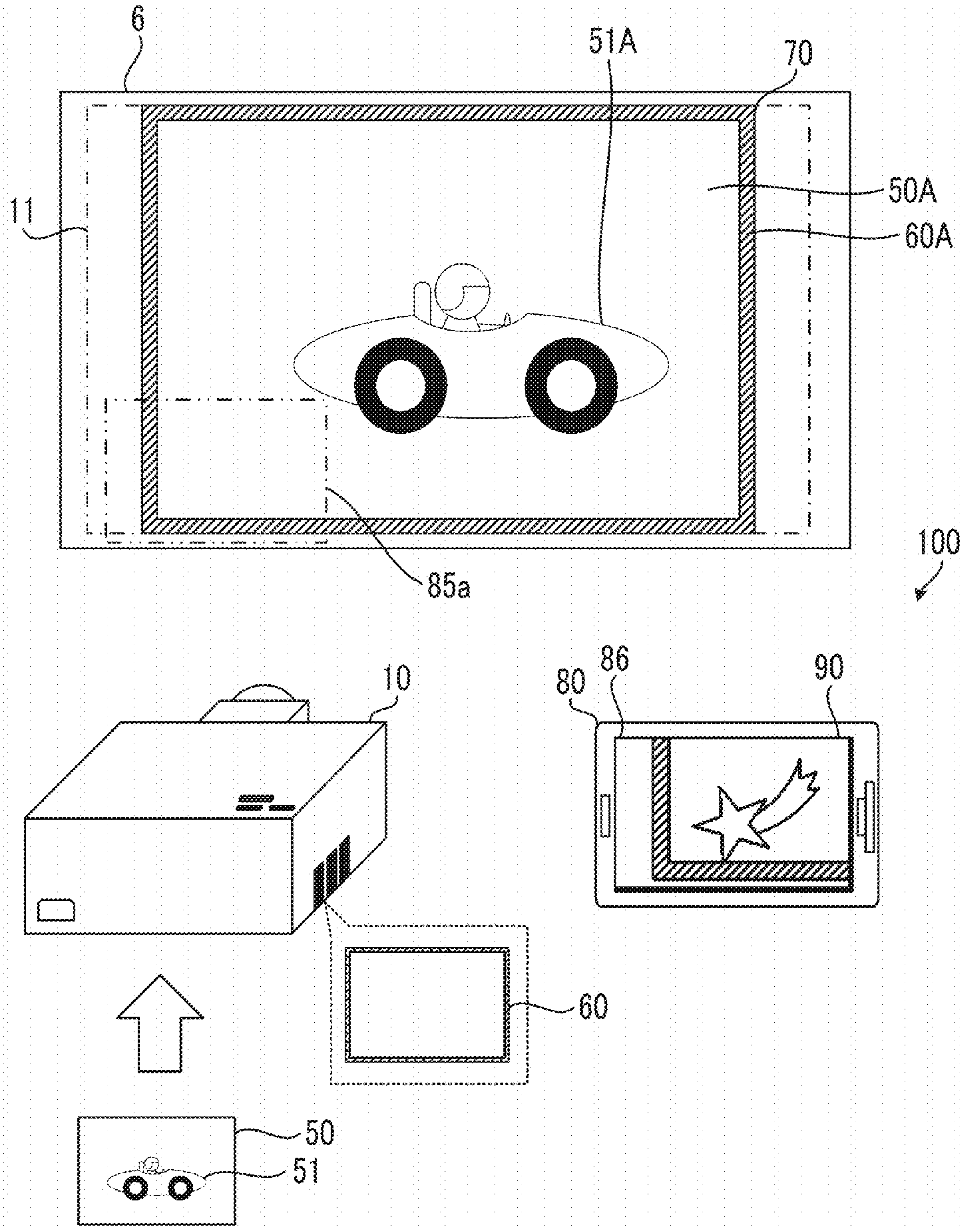
FIG. 14 is a diagram showing an example of the playback of the augmented reality content according to the attribute of the augmented reality content (part 2).

FIGS. 13 and 14 are diagrams showing examples of playback of the augmented reality content according to an attribute of the augmented reality content. In the examples of FIGS. 13 and 14, a smoke image 92 and a shooting star image 93 are associated with the projection image 70. The smoke image 92 is an example of first augmented reality content to be played back in a case where the car image 51A (first object) included in the projection target image 50A is included in the captured image (angle of view). The shooting star image 93 is an example of second augmented reality content to be played back regardless of whether or not the car image 51A is included in the captured image.

For example, the information terminal 80 operates as follows by a function of the above-described application. That is, the information terminal 80 stores image data representing the smoke image 92 and image data representing the shooting star image 93 in advance. In addition, attribute information indicating that the smoke image 92 is the first augmented reality content to be played back in a case where the car image 51A is included in the captured image is associated with the smoke image 92. Attribute information indicating that the shooting star image 93 is the second augmented reality content to be played back regardless of whether or not the car image 51A is included in the captured image is associated with the shooting star image 93.

In the example of FIG. 13, since the car image 51A is included in the imaging range 85*a*, the captured image including the car image 51A is obtained by the imaging using the imaging module 85 of the information terminal 80. In this case, the information terminal 80 causes the display unit 86 to display the superimposition image 90 in which the smoke image 92 and the shooting star image 93 are superimposed on the captured image.

In the example of FIG. 14, since the car image 51A is not included in the imaging range 85*a*, the captured image not including the car image 51A is obtained by the imaging using the imaging module 85 of the information terminal 80. In this case, the information terminal 80 causes the display unit 86 to display the superimposition image 90 in which only the shooting star image 93 is superimposed on the captured image.

As shown in FIGS. 13 and 14, the augmented reality content associated with the projection image 70 may include the first augmented reality content (for example, the smoke image 92 displayed only in a case where the car image 51A is shown) played back in a case where the car image 51A (first object) included in the projection target image 50 (first image) is included in the captured, and the second augmented reality content (for example, the shooting star image 93 displayed even in a case where the car image 51A is not shown) played back regardless of whether or not the car image 51A is included in the captured image.

In the examples shown in FIGS. 13 and 14, as shown in FIG. 11, the frame image 60 may include the identification information 61. As a result, the information terminal 80 can display the superimposition image 90 in which the shooting star image 93 is superimposed on the captured image, for example, in a case where the car image 51A of the projection target image 50 is not included in the captured image (for example, the example of FIG. 14) or in a case where only a part of the car image 51A is included in the captured image, based on the identification information 61 of the frame image 60.

Embodiment 2

Parts of Embodiment 2 different from Embodiment 1 will be described. In Embodiment 1, the configuration, in which the frame image 60A (second image) in the projection image 70 (third image) is the image indicating that the specific content is associated with the projection image 70 and is the image surrounding the projection target image 50A (first image) in the projection image 70, has been described, but the present invention is not limited to such a configuration.

In Embodiment 2, a configuration, in which the frame image 60A (second image) in the projection image 70 (third image) is an image indicating a position of an image of the first object with which the augmented reality content is associated, the image being included in the projection target image 50A, will be described.

<Position of Image of First Object with which Augmented Reality Content is Associated>

Figure 15:
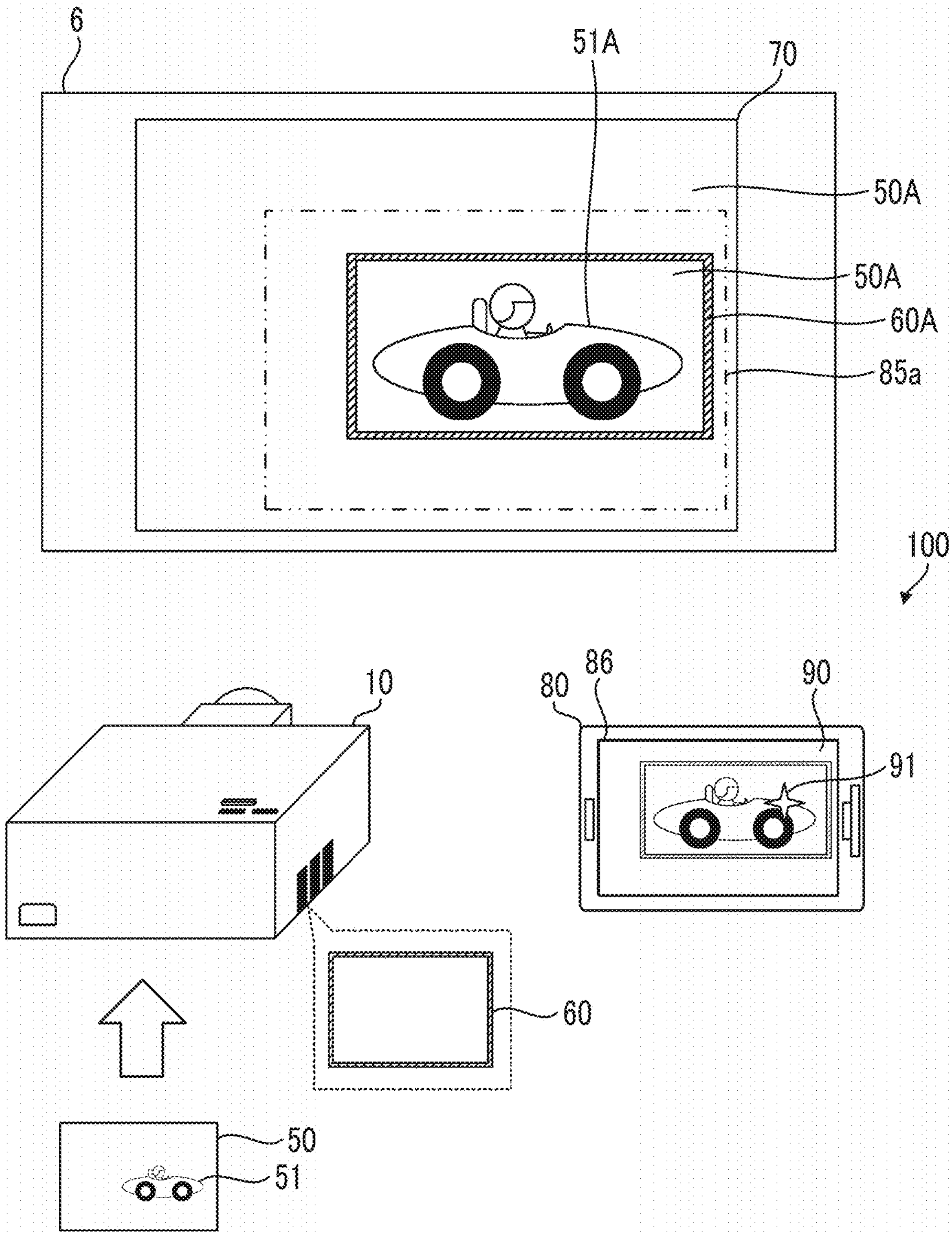
FIG. 15 is a diagram showing an example of a frame image 60A showing a position of an image of a first object with which an augmented reality content is associated.

FIG. 15 is a diagram showing an example of the frame image 60A indicating the position of the image of the first object with which the augmented reality content is associated. In the example of FIG. 15, the frame image 60 is used as the image indicating the position of the car image 51A (image of the first object).

For example, the control device 4 stores object position information indicating the region (position) of the car image 51 in the projection target image 50, and generates an image in which the frame image 60 is superimposed on the projection target image 50 such that the frame image 60 surrounds the car image 51 in the projection target image 50, as the projection image 70 (third image), based on the object position information.

In this case, a part of the projection image 70 on which the frame image 60 is superimposed is the frame image 60A based on the second image data (frame image 60). In addition, in the projection image 70, a part inside the frame image 60A and a part outside the frame image 60A are the projection target images 50A based on the first image data (projection target image 50).

As a result, it is possible to notify the user of the information terminal 80, who is the observer of the projection image 70, of the position of the car image 51A (image of the first object) with which the gloss image 91 (augmented reality content) is associated. The user of the information terminal 80 can recognize, through the frame image 60A of the projection image 70, that the augmented reality content is associated with the car image 51A inside the frame image 60A, and performs the imaging with the information terminal 80 by including the car image 51A in the imaging range 85*a*.

<Following of Frame Image 60A in Case where Image of First Object is Moved>

Figure 16:
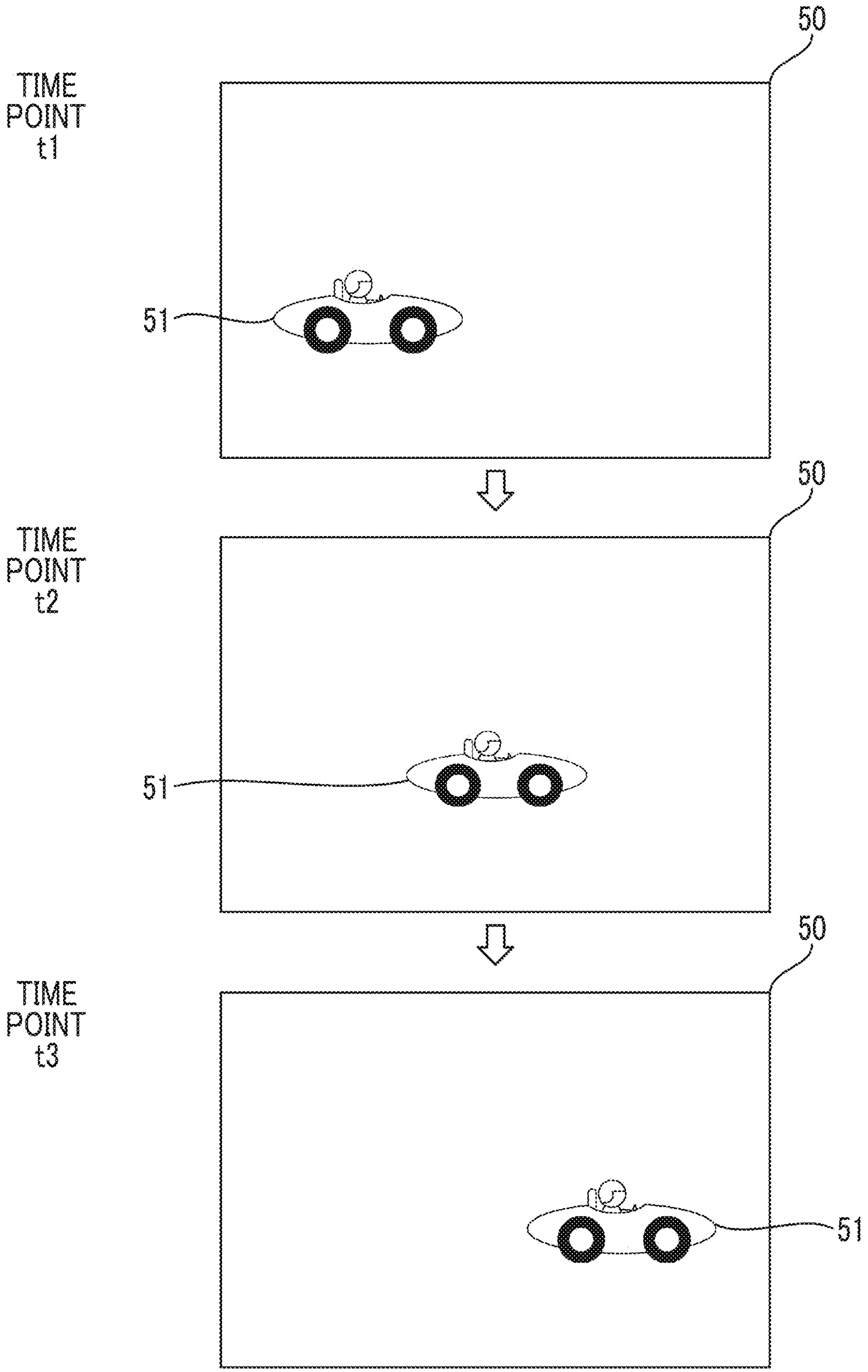
FIG. 16 is a diagram showing an example of following of the frame image 60A in a case where the image of the first object is moved (part 1).
Figure 17:
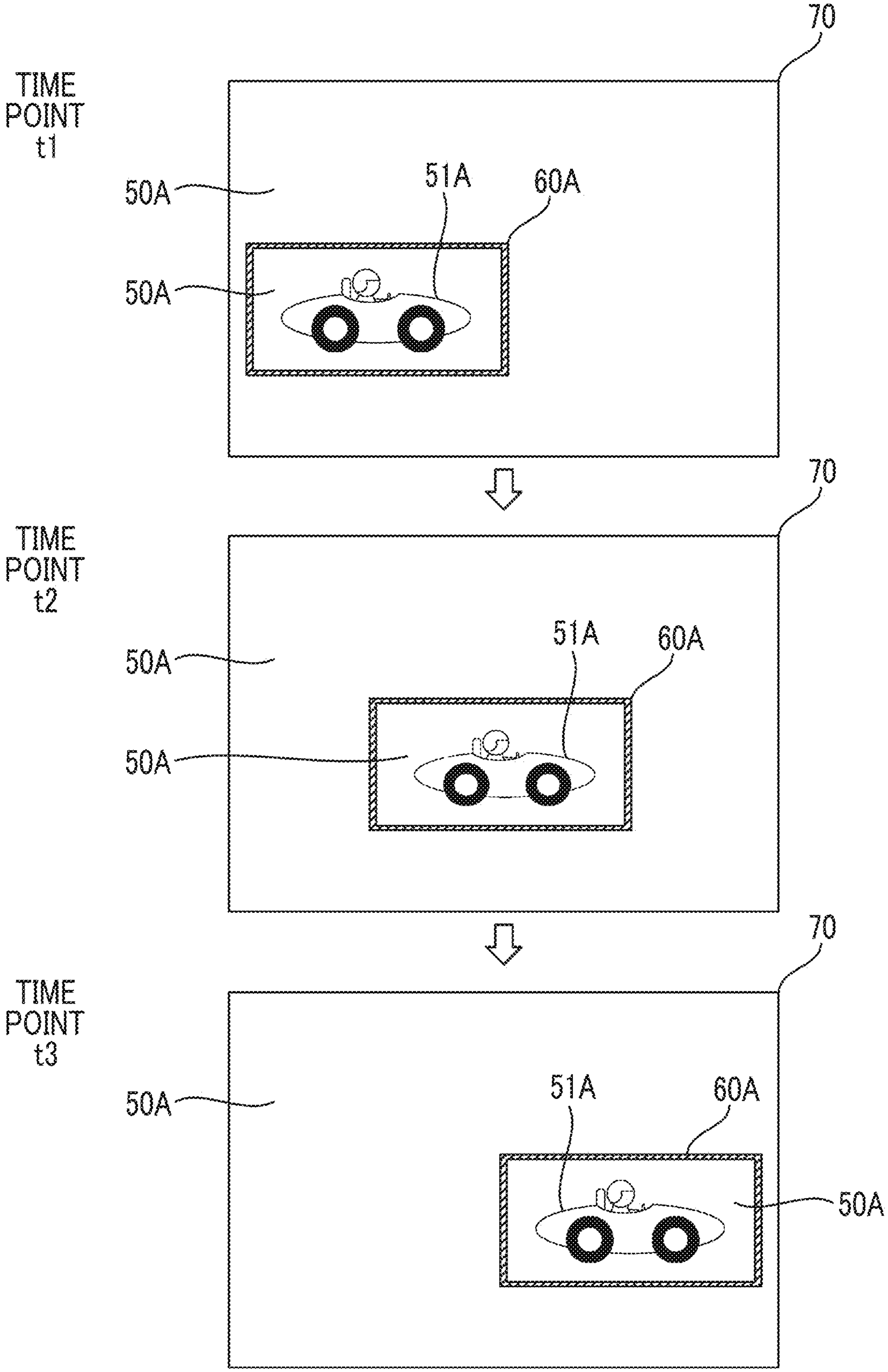
FIG. 17 is a diagram showing an example of the following of the frame image 60A in a case where the image of the first object is moved (part 2).

FIGS. 16 and 17 are diagrams showing an example of following of the frame image 60A in a case where the image of the first object is moved. The projection target image 50 may be motion picture content. For example, the projection target image 50 is motion picture content in which the car image 51 moves in the projection target image 50. FIG. 16 shows respective positions of the car image 51 at continuous time points t1 to t3. In the example of FIG. 16, the projection target image 50 is motion picture content in which the car image 51 moves from the left to the right according to an elapsed time of playback.

The control device 4 of the projection apparatus 10 can acquire correspondence information between the elapsed time of the playback of the projection target image 50 (for example, the time points t1 to t3) and the position of the car image 51 in the projection target image 50. The correspondence information may be stored in the storage medium 4*a* of the control device 4, or may be stored in another device communicable with the control device 4. The control device 4 may generate the projection image 70 including the frame image 60A that moves following the movement of the car image 51A, as shown in FIG. 17, based on the correspondence information.

In addition, the projection target image 50 may be motion picture content in which a size of the car image 51 changes according to the elapsed time of the playback. In this case, the control device 4 can acquire correspondence information between the elapsed time of the playback of the projection target image 50 and the size of the car image 51 in the projection target image 50. The control device 4 may generate the projection image 70 including the frame image 60A of which size is changed following a change in the size of the car image 51A, based on the correspondence information (not shown).

In addition, the projection target image 50 may be motion picture content in which the position and the size of the car image 51 change according to the elapsed time of the playback. In this case, the control device 4 can acquire correspondence information between the elapsed time of the playback of the projection target image 50 and the position and the size of the car image 51 in the projection target image 50. The control device 4 may generate the projection image 70 including the frame image 60A of which the size is changed following a change in the position and the size of the car image 51A, based on the correspondence information (not shown).

<Specific Example of Frame Image 60A Based on Information on Display Region and Position of Car Image 51>

Figure 18:
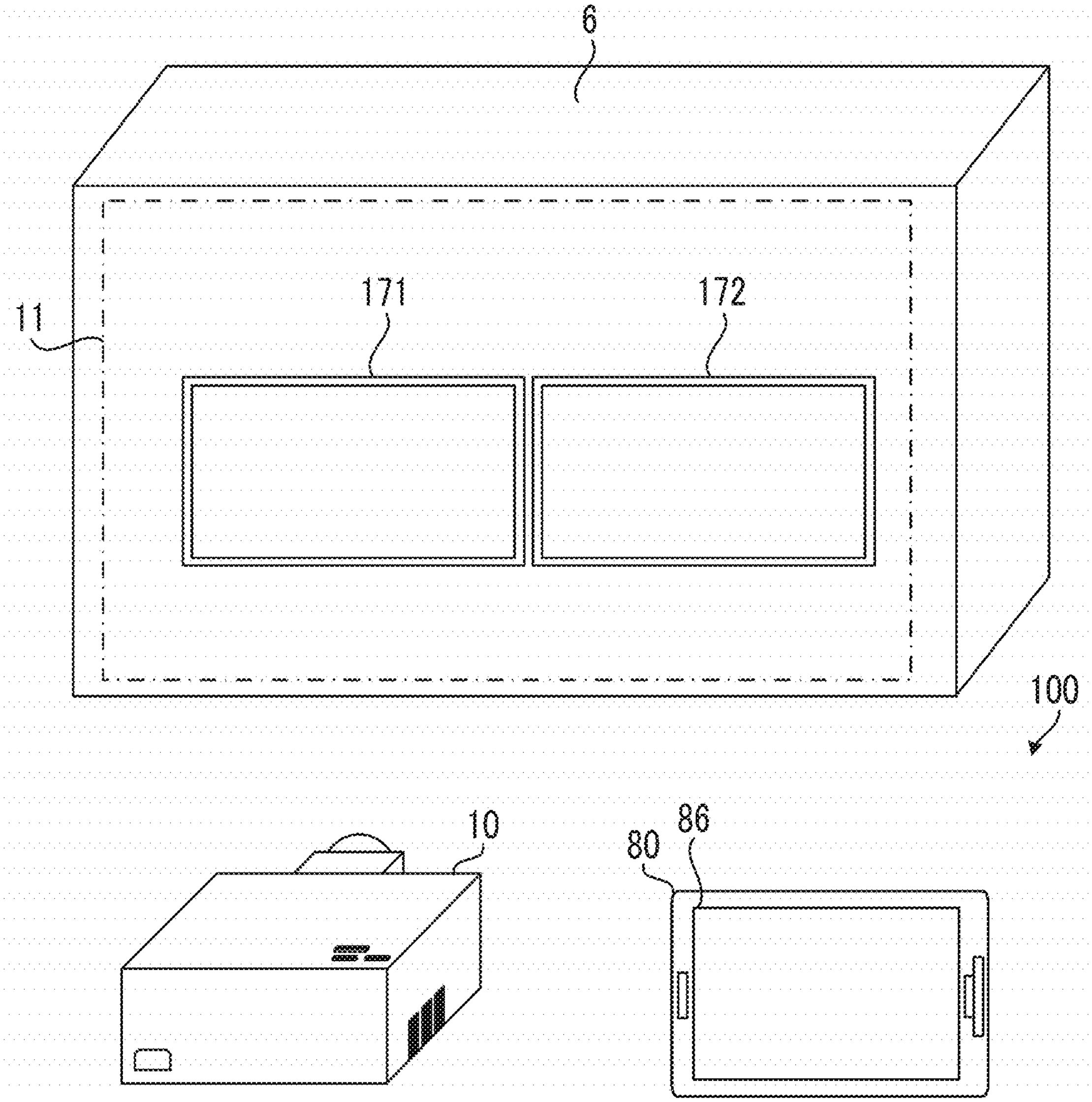
FIG. 18 is a diagram showing a specific example of the frame image 60A based on information on a display region and a position of a car image 51 (part 1).

FIGS. 18 to 21 are diagrams showing specific examples of the frame image 60A based on information on the display region and the position of the car image 51. In the example of FIG. 18, the projection target object 6 is a building having the windows 171 and 172, and the windows 171 and 172 are included in the projection range 11. In this case, the control device 4 of the projection apparatus 10 receives input of information indicating regions corresponding to the windows 171 and 172 in the projection range 11 as the information on the display region in which the projection image 70 is displayed. The input of this information is performed, for example, via the operation reception portion 2.

For example, as shown in FIG. 16, it is assumed that the projection target image 50 is motion picture content in which the car image 51 moves from the left to the right according to the elapsed time of the playback. The control device 4 can acquire the correspondence information between the elapsed time of the playback of the projection target image 50 (for example, the time points t1 to t3) and the position of the car image 51 in the projection target image 50.

Figure 19:
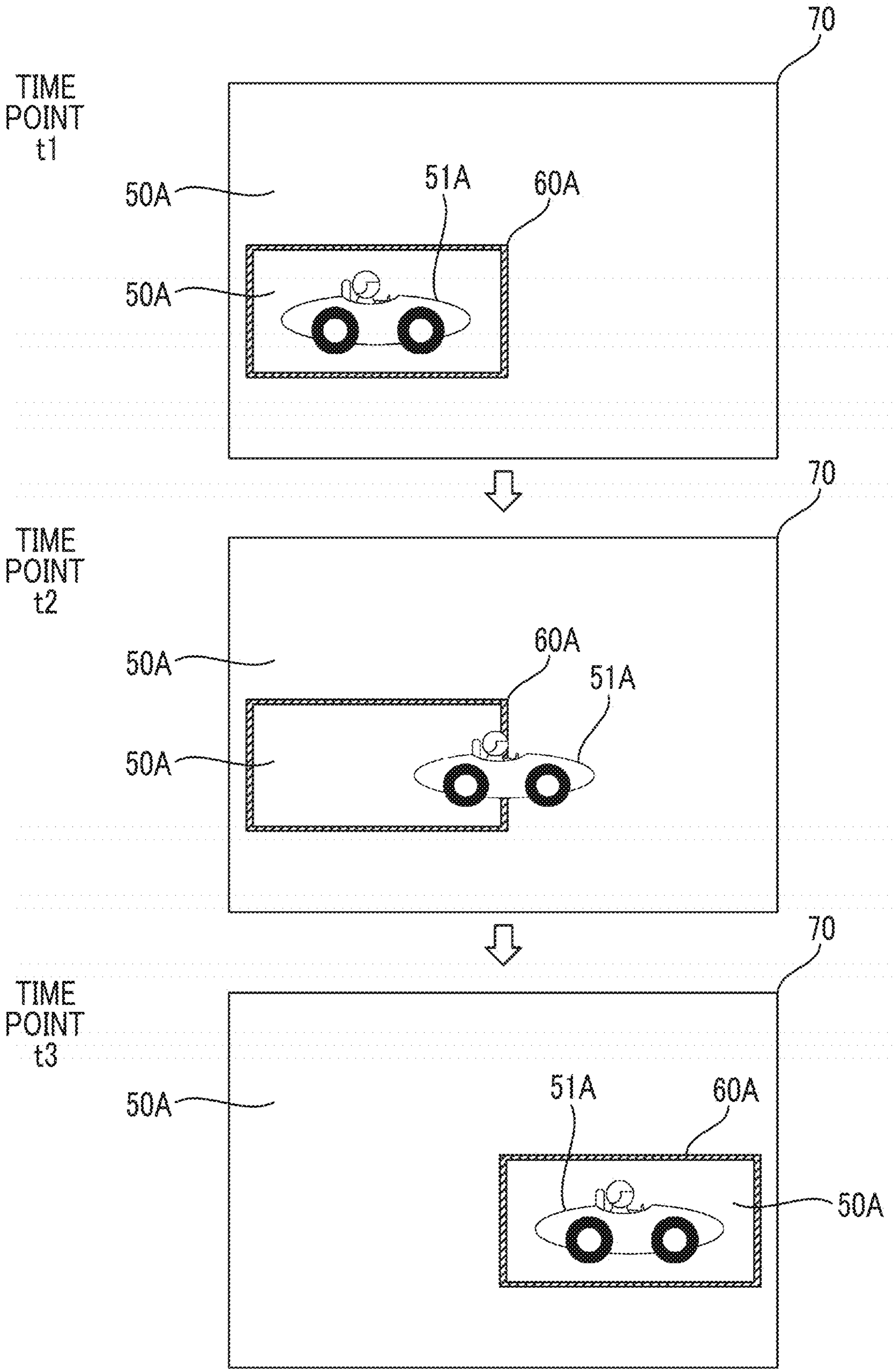
FIG. 19 is a diagram showing a specific example of the frame image 60A based on the information on the display region and the position of the car image 51 (part 2).

For example, the control device 4 includes the frame image 60A in the projection image 70 as shown in the example shown in FIG. 19. That is, in a case where the time point t1 at which the car image 51A is located in the region of the projection image 70 (projection range 11) corresponding to the window 171 is reached, the control device 4 includes the frame image 60A in the region of the projection image 70 corresponding to the window 171. In addition, the control device 4 maintains a state in which the frame image 60A is included in the region of the projection image 70 corresponding to the window 172 at the time point t2 at which the car image 51A is located in a region of the projection image 70 corresponding to an interval between the window 171 and the window 172. In addition, in a case where the time point t3 at which the car image 51A is located in the region of the projection image 70 corresponding to the window 172 is reached, the control device 4 includes the frame image 60A in the region of the projection image 70 corresponding to the window 172.

Figure 20:
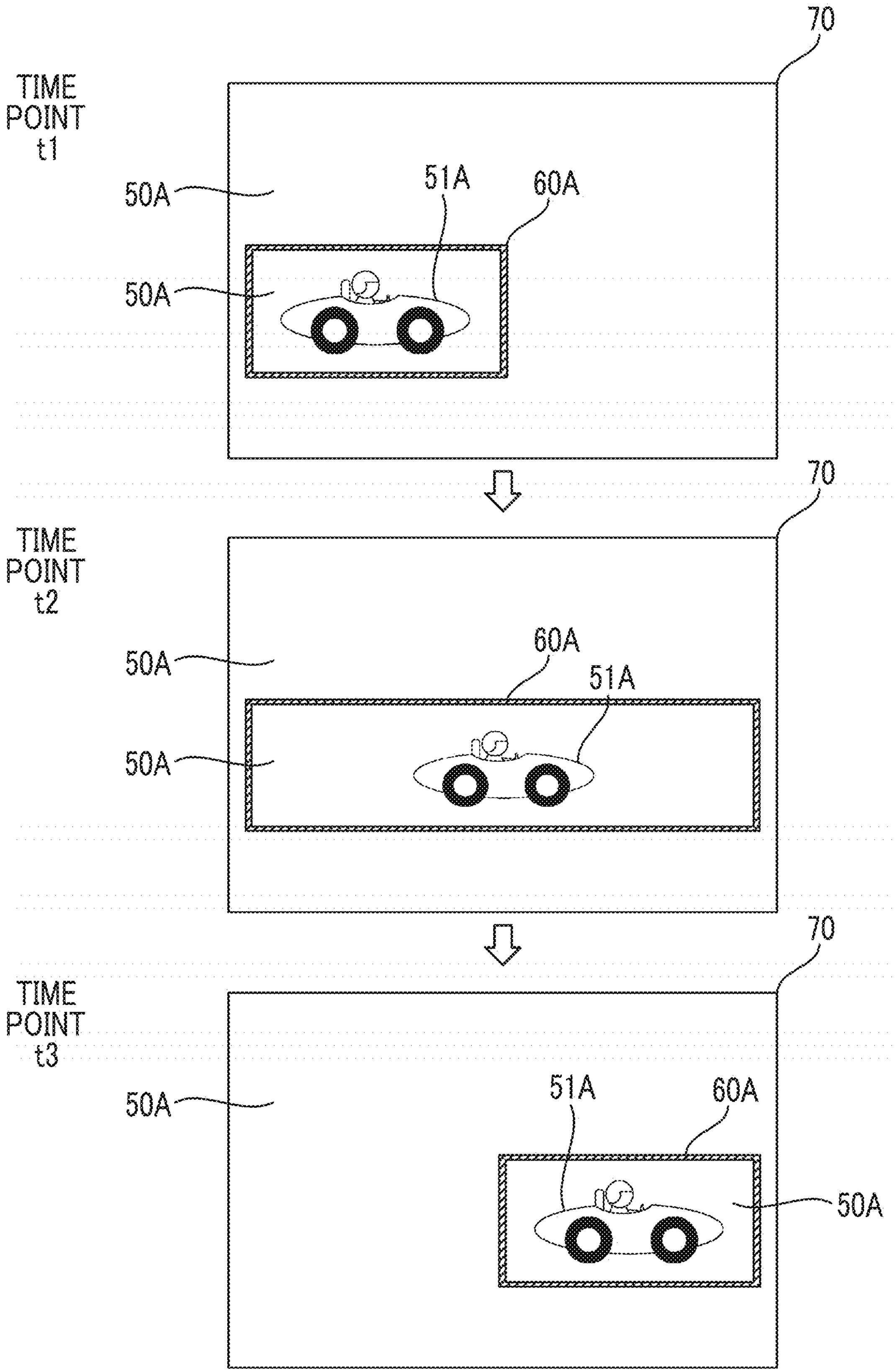
FIG. 20 is a diagram showing a specific example of the frame image 60A based on the information on the display region and the position of the car image 51 (part 3).

In addition, the control device 4 may include a frame image 60A in the projection image 70 as shown in the example shown in FIG. 20. That is, the control device 4 may include the frame image 60A in the projection image 70 such that the region of the projection image 70 corresponding to the window 171 and the region of the projection image 70 corresponding to the window 172 are included at the time point t2 at which the car image 51A is located in the region of the projection image 70 corresponding to the interval between the window 171 and the window 172. At the time point t2, the control device 4 may include the frame image 60A in the projection image 70 such that the frame image 60A is provided along an outer periphery of the projection image 70, without being limited to the example of FIG. 20.

Figure 21:
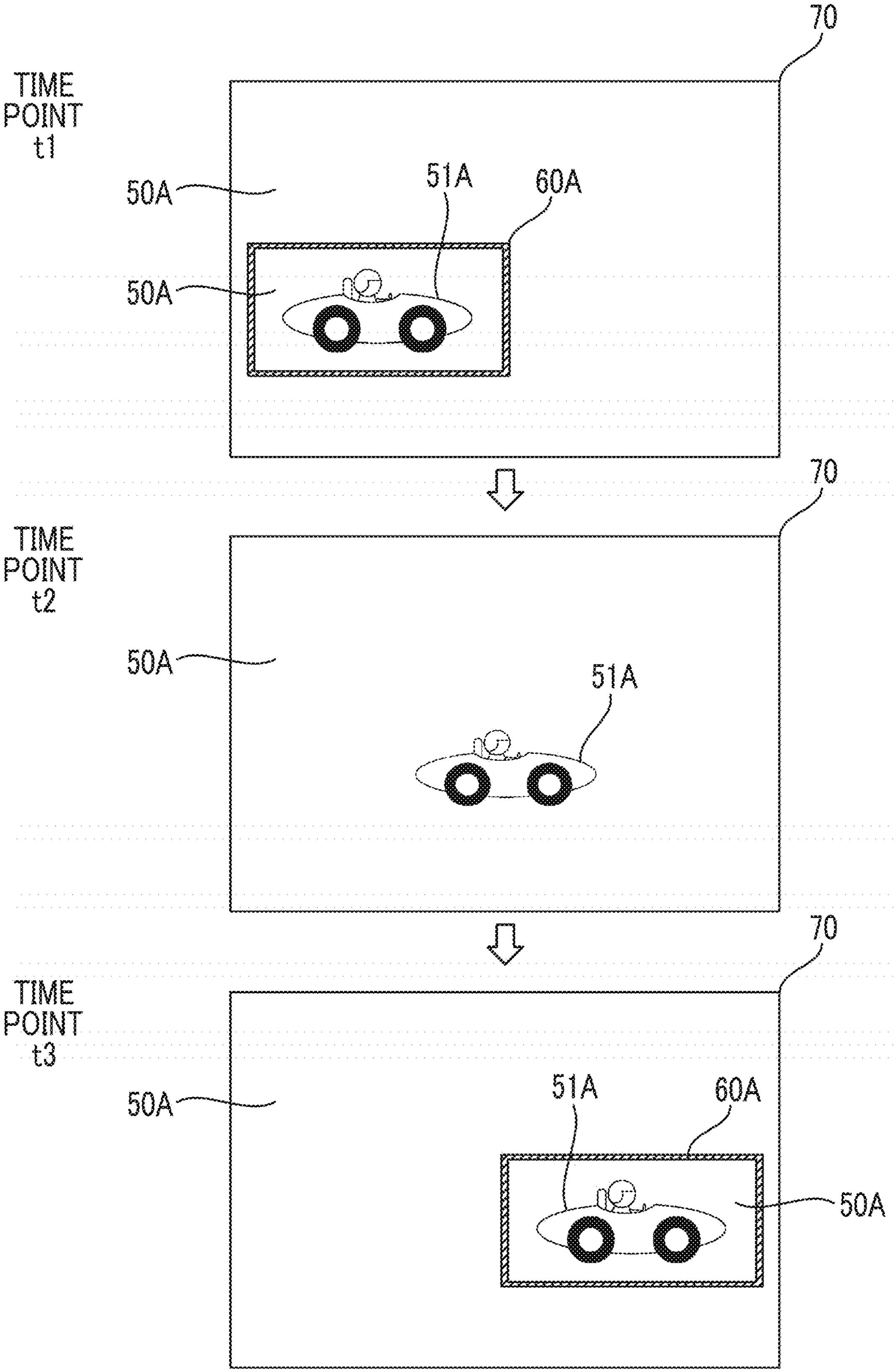
FIG. 21 is a diagram showing a specific example of the frame image 60A based on the information on the display region and the position of the car image 51 (part 4).

In addition, the control device 4 may include the frame image 60A in the projection image 70 as shown in the example shown in FIG. 21. That is, the control device 4 may not include the frame image 60A (erase the frame image 60A) in the projection image 70 at the time point t2 at which the car image 51A is located in the region of the projection image 70 corresponding to the interval between the window 171 and the window 172.

In addition, for example, in a case where a time point, which is a predetermined time before the time point t1 at which the car image 51A is located in the region of the projection image 70 corresponding to the window 171, is reached, the control device 4 may cause the frame image 60A to be included in the region of the projection image 70 corresponding to the window 171 (not shown). Similarly, for example, in a case where the time point, which is a predetermined time before the time point t2 at which the car image 51A is located in the region of the projection image 70 corresponding to the window 172, is reached, the control device 4 may cause the frame image 60A to be included in the region of the projection image 70 corresponding to the window 172.

As described with reference to FIGS. 18 to 21, the control device 4 may generate the third image data representing the projection image 70 including the frame image 60A (second image) based on the information on the display region in which the projection image 70 (third image) is displayed and the position of the car image 51 (image of the first object) in the projection target image 50.

It should be noted that, in Embodiment 2, the configuration in which the frame image 60A is a frame image that completely surrounds the car image 51A has been described, but the frame image 60A of Embodiment 2 may surround (sandwich) the car image 51A in, for example, an L-shape as in the frame image 60A shown in FIG. 8.

In addition, the frame image 60A has been described as the second image of Embodiment 2, but the second image of Embodiment 2 is not limited to the frame image, and may be, for example, an arrow image indicating the position of the car image 51A.

MODIFICATION EXAMPLE OF EACH EMBODIMENT

Modification Example of Projection Apparatus 10

While the configuration in which the optical axis K is not bent has been described as the configuration of the projection apparatus 10 in FIGS. 4 and 5, a configuration in which the optical axis K is bent once or more by providing a reflective member in the optical unit 106 may be adopted.

Figure 22:
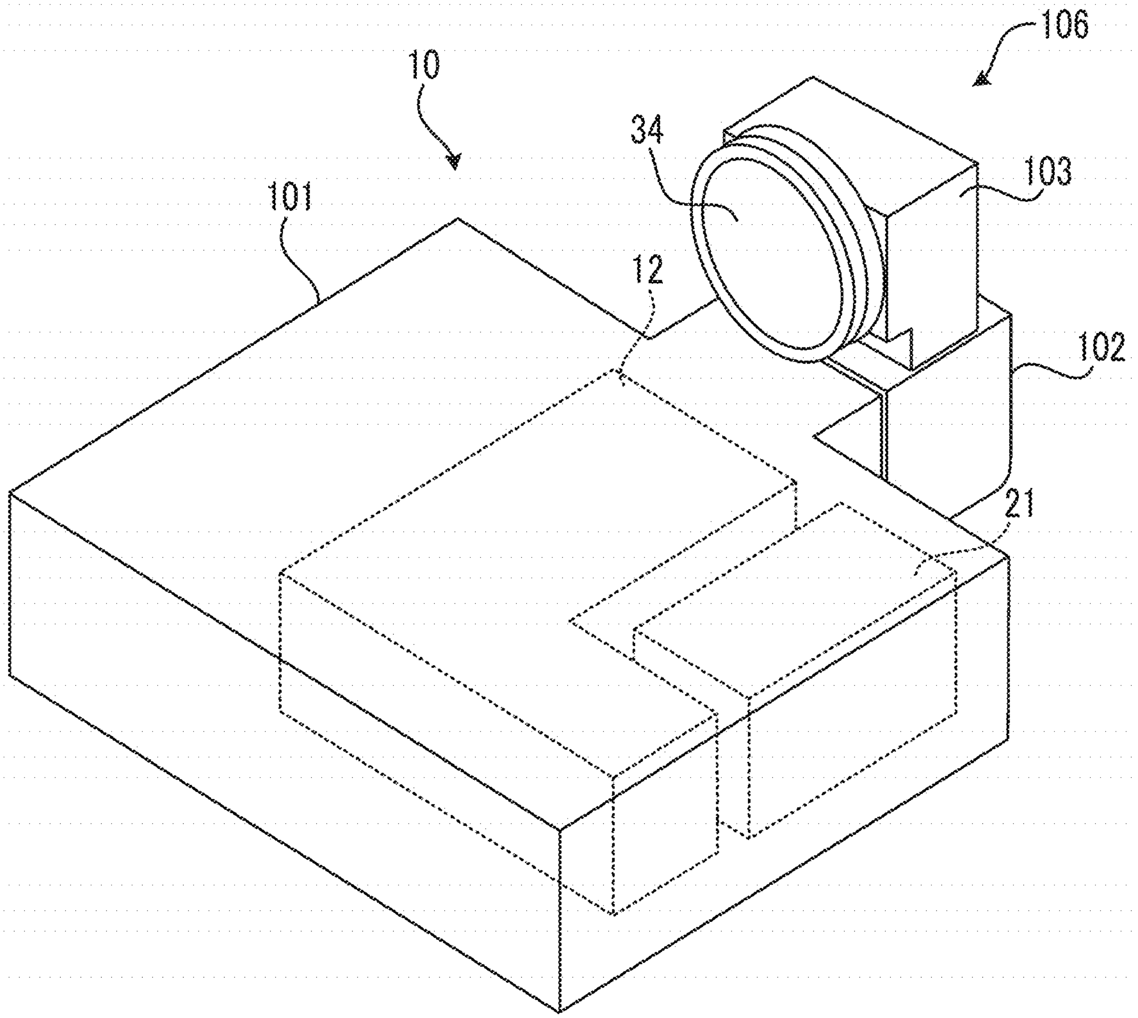
FIG. 22 is a schematic diagram showing another exterior configuration of the projection apparatus 10.
Figure 23:
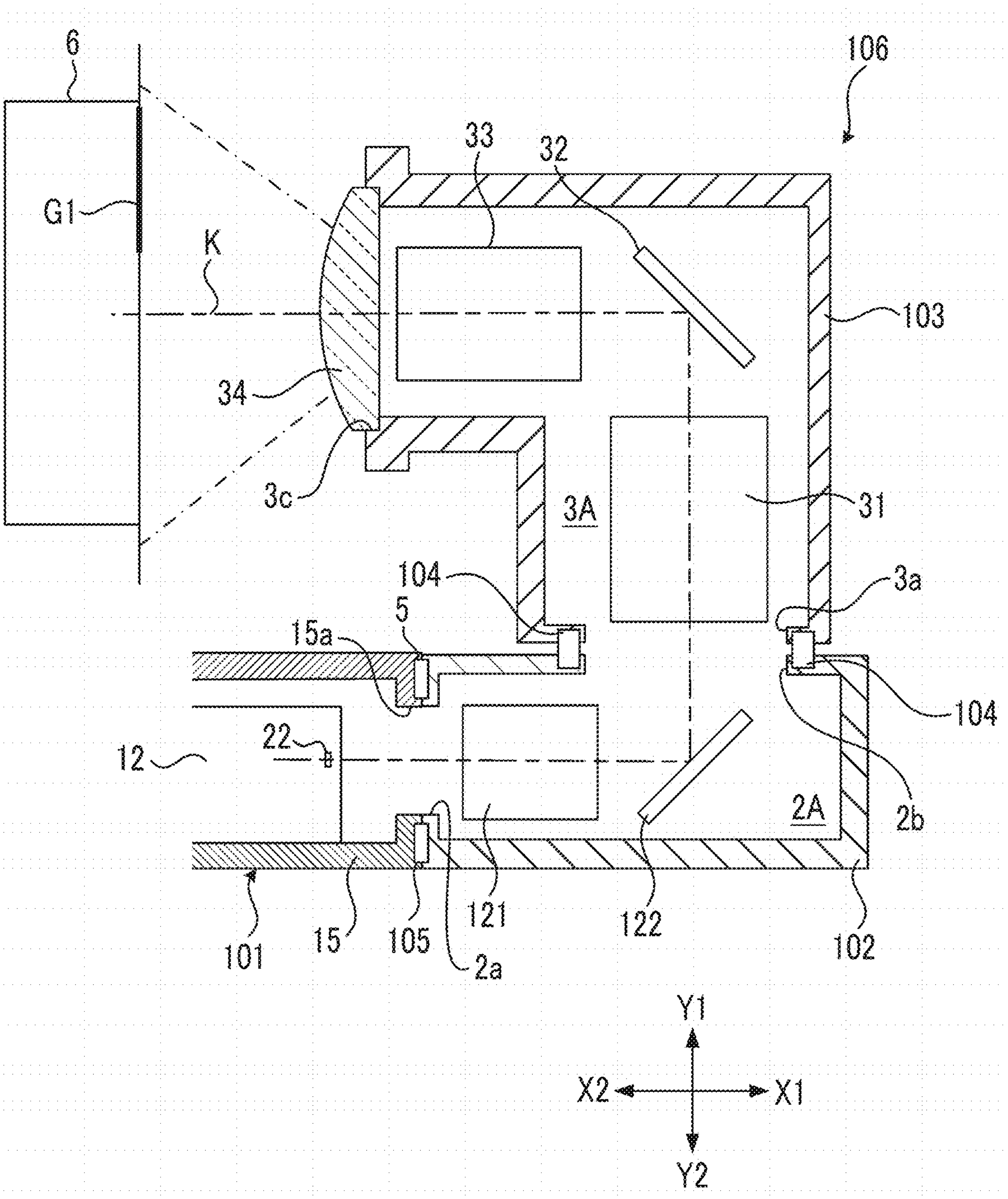
FIG. 23 is a schematic cross-sectional view of the optical unit 106 of the projection apparatus 10 shown in FIG. 22.

FIG. 22 is a schematic diagram showing another exterior configuration of the projection apparatus 10. FIG. 23 is a schematic cross-sectional view of the optical unit 106 of the projection apparatus 10 shown in FIG. 22. In FIGS. 22 and 23, the same parts as the parts illustrated in FIGS. 4 and 5 will be designated by the same reference numerals and will not be described.

As shown in FIG. 22, the optical unit 106 comprises a second member 103 supported by the first member 102 in addition to the first member 102 supported by the body part 101. The first member 102 and the second member 103 may be an integrated member.

As shown in FIG. 23, the optical unit 106 comprises, in addition to the first member 102, the second member 103 including a hollow portion 3A connected to the hollow portion 2A of the first member 102; the first optical system 121 and a reflective member 122 disposed in the hollow portion 2A; a second optical system 31, a reflective member 32, a third optical system 33, and the lens 34 disposed in the hollow portion 3A; the first shift mechanism 105; and a projection direction changing mechanism 104.

In the examples in FIGS. 22 and 23, the opening 2*a* and the opening 2*b* of the first member 102 are formed in surfaces perpendicular to each other. In addition, the projection optical system 23 shown in FIGS. 22 and 23 is composed of the reflective member 122, the second optical system 31, the reflective member 32, and the third optical system 33 in addition to the first optical system 121 and the lens 34 shown in FIGS. 4 and 5. With such a projection optical system 23, as shown in FIG. 23, the optical axis K is bent twice to be folded. The first optical system 121, the reflective member 122, the second optical system 31, the reflective member 32, the third optical system 33, and the lens 34 are disposed in this order from an optical modulation portion 22 side along the optical axis K.

The first optical system 121 guides the light that is incident on the first member 102 from the body part 101 and that travels in the direction X1 to the reflective member 122. The reflective member 122 reflects the light incident from the first optical system 121 in the direction Y1. The reflective member 122 is composed of, for example, a mirror. In the first member 102, the opening 2*b* is formed on an optical path of the light reflected by the reflective member 122, and the reflected light travels to the hollow portion 3A of the second member 103 by passing through the opening 2*b*.

The second member 103 is a member having an approximately L-shaped cross-sectional exterior, in which an opening 3*a* is formed at a position facing the opening 2*b* of the first member 102. The light from the body part 101 that has passed through the opening 2*b* of the first member 102 is incident into the hollow portion 3A of the second member 103 through the opening 3*a*. The first member 102 and the second member 103 may have any cross-sectional exterior and are not limited to the above.

The second optical system 31 includes at least one lens and guides the light incident from the first member 102 to the reflective member 32. The reflective member 32 guides the light incident from the second optical system 31 to the third optical system 33 by reflecting the light in the direction X2. The reflective member 32 is composed of, for example, a mirror. The third optical system 33 includes at least one lens and guides the light reflected by the reflective member 32 to the lens 34.

The lens 34 closes an opening 3*c* formed in an end part of the second member 103 on a direction X2 side and is disposed in the end part. The lens 34 projects the light incident from the third optical system 33 to the projection target object 6.

FIG. 23 shows the state where the first member 102 is moved as far as possible to the direction Y1 side by the first shift mechanism 105. By moving the first member 102 in the direction Y2 via the first shift mechanism 105 from the state shown in FIG. 23, the relative position between a center of the image formed by the optical modulation portion 22 and the optical axis K changes, and the image G1 projected to the projection target object 6 can be shifted in the direction Y1.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to a disposition position shown in FIG. 23 as long as the projection direction changing mechanism 104 can rotate the optical system. In addition, the number of rotation mechanisms is not limited to one, and a plurality of rotation mechanisms may be provided.

Modification Example of Control Device

Although a case in which the control device according to the embodiment of the present invention is applied to the control device 4 of the projection apparatus 10 has been described, the present invention is not limited to such a configuration.

Figure 24:
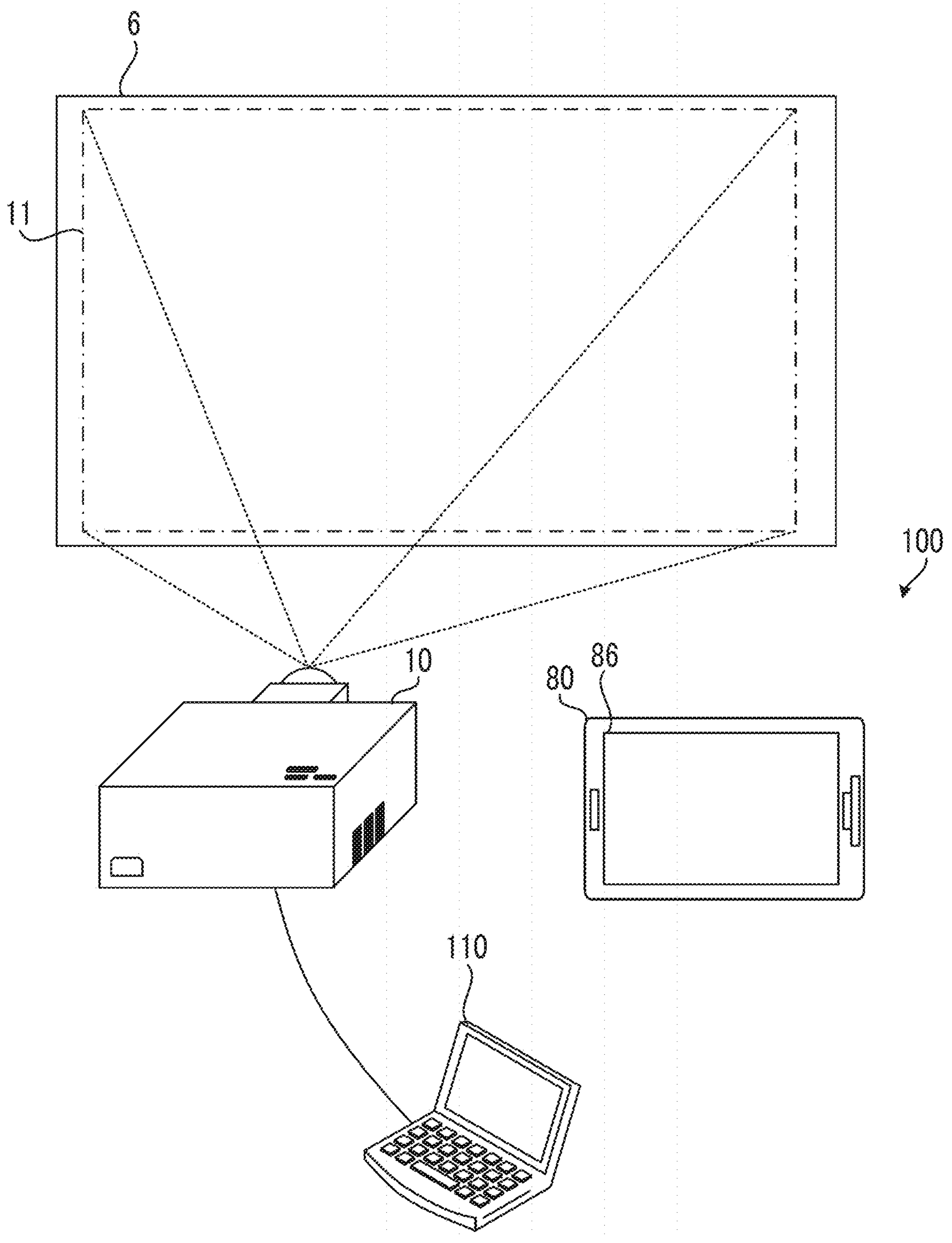
FIG. 24 is a diagram showing a modification example of the projection system 100.

FIG. 24 is a diagram showing a modification example of the projection system 100. In the projection system 100 shown in FIG. 24, an information terminal 110 is included in addition to the configuration of the projection system 100 shown in FIG. 1. The control device according to the embodiment of the present invention may be applied to the information terminal 110.

The information terminal 110 is an information terminal that can directly or indirectly communicate with the projection apparatus 10. The communication between the information terminal 110 and the projection apparatus 10 may be wired communication or wireless communication. The information terminal 110 communicates with the projection apparatus 10 to execute various types of control performed by the control device 4. In the example of FIG. 24, the information terminal 110 is a notebook-type personal computer, but the information terminal 110 can be various information terminals such as a desktop-type personal computer, a smartphone, and a tablet terminal.

For example, the first image data representing the projection target image 50 is input to the information terminal 110. In addition, the second image data representing the frame image 60 is stored in a storage medium of the information terminal 110. The information terminal 110 generates the third image data representing the projection image 70 based on these pieces of image data and the like, and outputs the generated third image data to the projection apparatus 10 (projection portion). The projection apparatus 10 projects the projection image 70 based on the third image data output from the information terminal 110.

Figure 25:
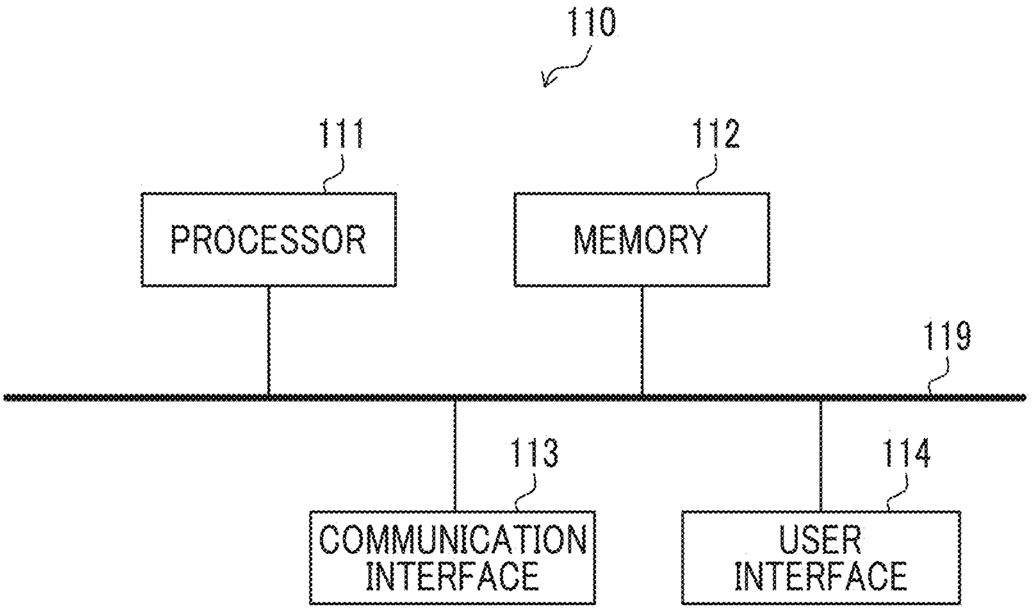
FIG. 25 is a diagram showing an example of a hardware configuration of an information terminal 110.

FIG. 25 is a diagram showing an example of a hardware configuration of the information terminal 110. As shown in FIG. 25, the information terminal 110 shown in FIG. 1 comprises a processor 111, a memory 112, a communication interface 113, and a user interface 114. The processor 111, the memory 112, the communication interface 113, and the user interface 114 are connected by, for example, a bus 119. The processor 111, the memory 112, the communication interface 113, and the user interface 114 have the same configurations as the processor 81, the memory 82, the communication interface 83, and the user interface 84 shown in FIG. 6, respectively.

Modification Example of Display of Third Image

A configuration in which the control device according to the embodiment of the present invention projects the third image (projection image 70) represented by the generated third image data using the projection apparatus 10 has been described, but the present invention is not limited to such a configuration. For example, the control device according to the embodiment of the present invention may output the generated third image data to a display on which an image can be displayed. As a result, the third image (for example, the same image as the projection image 70) represented by the third image data is displayed on the display. The display may be a display of a display device including the control device according to the embodiment of the present invention, or may be an external display capable of communicating with the control device of the present invention.

Other Examples of Specific Content

Although the augmented reality content has been described as the example of the specific content associated with the projection image 70, the specific content associated with the projection image 70 is not limited to the augmented reality content. For example, the specific content associated with the projection image 70 may be content related to a sense other than the visual sense, such as sound or smell.

At least the following matters are disclosed in the present specification.

(1)

A control device comprising a processor,
in which the processor is configured to:
generate third image data based on first image data and second image data; and
output the third image data, and
a second image based on the second image data in a third image represented by the third image data is an image indicating that specific content is associated with the third image, and surrounds a first image based on the first image data in the third image.

(2)

The control device according to (1),
in which the second image is in contact with at least a part of an outer periphery of the first image, and does not include an internal region of the first image.

(3)

The control device according to (1) or (2),
in which the processor is configured to output the third image data to a projection portion.

(4)

The control device according to any one of (1) to (3),
in which the processor is configured to generate the third image data based on information on a display region in which the third image is displayed, the first image data, and the second image data.

(5)

The control device according to any one of (1) to (4),
in which the second image is an image determined based on a color of the first image.

(6)

The control device according to any one of (1) to (5),
in which the second image is a frame image that surrounds at least a part of the first image.

(7)

The control device according to any one of (1) to (6),
in which the first image is an image with which the specific content is associated.

(8)

The control device according to any one of (1) to (7),
in which the second image is an image with which the specific content is associated.

(9)

The control device according to any one of (1) to (8),
in which the specific content includes augmented reality content.

(10)

The control device according to (9),
in which the augmented reality content includes first augmented reality content that is played back in a case where a first object included in the first image is included in an imaging angle of view, and second augmented reality content that is played back regardless of whether or not the first object is included in the imaging angle of view.

(11)

The control device according to any one of (1) to (10),
in which the second image includes an identification image, and
the identification image is information with which a relative position of the identification image in the third image is specifiable.

(12)

A control device comprising a processor,
in which the processor is configured to:
generate third image data based on first image data and second image data; and
output the third image data, and
a second image based on the second image data in a third image represented by the third image data is an image that is included in a first image based on the first image data in the third image and indicates a position of an image of a first object with which specific content is associated.

(13)

The control device according to (12),
in which the image of the first object is an image that moves in the third image,
the second image is an image that moves following movement of the image of the first object.

(14)

The control device according to (12) or (13),
in which the processor is configured to generate the third image data representing the third image including the second image, based on correspondence information between an elapsed time of playback of the first image and at least one of the position or a size of the image of the first object in the first image.

(15)

The control device according to any one of (12) to (14),
in which the processor is configured to generate the third image data representing the third image including the second image based on information on a feature region of a display region in which the third image is displayed, and the position of the image of the first object in the first image.

(16)

The control device according to any one of (12) to (15),
in which the second image is a frame image that surrounds at least a part of the image of the first object.

(17)

A control method executed by a processor of a control device, the method comprising:
generating third image data based on first image data and second image data; and
outputting the third image data,
in which a second image based on the second image data in a third image represented by the third image data is an image indicating that specific content is associated with the third image, and surrounds a first image based on the first image data in the third image.

(18)

A control method executed by a processor of a control device, the method comprising:
generating third image data based on first image data and second image data; and
outputting the third image data,
in which a second image based on the second image data in a third image represented by the third image data is an image that is included in a first image based on the first image data in the third image and indicates a position of an image of a first object with which specific content is associated.

(19)

A control program for causing a processor of a control device to execute a process comprising:
generating third image data based on first image data and second image data; and
outputting the third image data,
in which a second image based on the second image data in a third image represented by the third image data is an image indicating that specific content is associated with the third image, and surrounds a first image based on the first image data in the third image.

(20)

A control program for causing a processor of a control device to execute a process comprising:
generating third image data based on first image data and second image data; and
outputting the third image data,
in which a second image based on the second image data in a third image represented by the third image data is an image that is included in a first image based on the first image data in the third image and indicates a position of an image of a first object with which specific content is associated.

While various embodiments have been described above with reference to the drawings, the present invention is, of course, not limited to such examples. It is apparent that those skilled in the art may perceive various modification examples or correction examples within the scope disclosed in the claims, and those examples are also understood as falling within the technical scope of the present invention. In addition, each constituent in the embodiment may be used in any combination without departing from the gist of the invention.

The present application is based on Japanese Patent Application (JP2021-194119) filed on Nov. 30, 2021, the content of which is incorporated in the present application by reference.

EXPLANATION OF REFERENCES

1: projection portion
2: operation reception portion
2A, 3A: hollow portion
2*a*, 2*b*, 3*a*, 3*c*, 15*a*: opening
4: control device
4*a*: storage medium
5: communication portion
6: projection target object
6*a*: projection region
10: projection apparatus
11: projection range
12: optical modulation unit
15: housing
21: light source
22: optical modulation portion
23: projection optical system
24: control circuit
31: second optical system
32, 122: reflective member
33: third optical system
34: lens
50, 50A: projection target image
51, 51A: car image

60, 60A: frame image
61: identification information
70: projection image
80, 110: information terminal
81, 111: processor
82, 112: memory
83, 113: communication interface
84, 114: user interface
85: imaging module
85*a*: imaging range
86: display unit
89, 119: bus
90: superimposition image
91: gloss image
92: smoke image
93: shooting star image
94: arrow image
100: projection system
101: body part
102: first member
103: second member
104: projection direction changing mechanism
105: first shift mechanism
106: optical unit
121: first optical system
171, 172: window
G1: image

What is claimed is:

1. A control device comprising a processor,
wherein the processor is configured to:
generate third image data based on first image data and second image data; and
output the third image data, and
a second image based on the second image data in a third image represented by the third image data is an image that is included in a first image based on the first image data in the third image and that indicates a position of an image of a first object with which specific content, which is different from a content of the third image, is associated, wherein
the processor is configured to generate the third image data representing the third image including the second image, based on correspondence information between an elapsed time of playback of the first image and at least one of the position or a size of the image of the first object in the first image.

2. The control device according to claim 1,
wherein the second image is in contact with at least a part of an outer periphery of the first image, and does not include an internal region of the first image.

3. The control device according to claim 1,
wherein the processor is configured to output the third image data to a projection portion.

4. The control device according to claim 1,
wherein the processor is configured to generate the third image data based on information on a display region in which the third image is to be displayed, the first image data, and the second image data.

5. The control device according to claim 1,
wherein the second image is an image determined based on a color of the first image.

6. The control device according to claim 1,
wherein the first image is an image with which the specific content is associated.

7. The control device according to claim 1,
wherein the second image is an image with which the specific content is associated.

8. The control device according to claim 1,
wherein the specific content includes augmented reality content.

9. The control device according to claim 8,
wherein the augmented reality content includes first augmented reality content that is played back in a case where a first object included in the first image is included in an imaging angle of view, and second augmented reality content that is played back regardless of whether or not the first object is included in the imaging angle of view.

10. The control device according to claim 1,
wherein the second image includes an identification image, and
the identification image is information with which a relative position of the identification image in the third image is specifiable.

11. The control device according to claim 1,
wherein the image of the first object is an image that moves in the third image, and
the second image is an image that moves following movement of the image of the first object.

12. The control device according to claim 1,
wherein the processor is configured to generate the third image data representing the third image including the second image based on information on a feature region of a display region in which the third image is to be displayed, and the position of the image of the first object in the first image.

13. The control device according to claim 1,
wherein the second image is a frame image that surrounds at least a part of the image of the first object.

14. A control method executed by a processor of a control device, the method comprising:
generating third image data based on first image data and second image data;
outputting the third image data; and
generating the third image data representing the third image including the second image, based on correspondence information between an elapsed time of playback of the first image and at least one of the position or a size of the image of the first object in the first image,
wherein a second image based on the second image data in a third image represented by the third image data is an image that is included in a first image based on the first image data in the third image and that indicates a position of an image of a first object with which specific content, which is different from a content of the third image, is associated.

15. A non-transitory computer readable medium storing a control program for causing a processor of a control device to execute a process comprising:
generating third image data based on first image data and second image data;
outputting the third image data; and
generating the third image data representing the third image including the second image, based on correspondence information between an elapsed time of playback of the first image and at least one of the position or a size of the image of the first object in the first image,
wherein a second image based on the second image data in a third image represented by the third image data is an image that is included in a first image based on the first image data in the third image and that indicates a position of an image of a first object with which specific content, which is different from a content of the third image, is associated.

* * * * *